US012689577B2

(12) United States Patent
Sanghvi et al.

(10) Patent No.: US 12,689,577 B2
(45) Date of Patent: Jul. 21, 2026

(54) OPTIMIZING NETWORK ROUTING AND DATA PROCESSING WITH DYNAMIC ROUTE OPTIMIZATION

(71) Applicant: Bank of America Corporation, Charlotte, NC (US)

(72) Inventors: Siten Sanghvi, Westfield, NJ (US); Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 64 days.

(21) Appl. No.: 18/762,855

(22) Filed: Jul. 3, 2024

(65) Prior Publication Data

US 2026/0012411 A1 Jan. 8, 2026

(51) Int. Cl.
*H04L 45/12* (2022.01)
*H04L 41/16* (2022.01)
(Continued)

(52) U.S. Cl.
CPC ............ *H04L 45/123* (2013.01); *H04L 41/16* (2013.01); *H04L 43/062* (2013.01); *H04L 45/03* (2022.05)

(58) Field of Classification Search
CPC ..... H04L 9/50; H04L 67/1097; H04L 9/3239; H04L 2209/56; H04L 67/12;
(Continued)

(56) References Cited

U.S. PATENT DOCUMENTS

| | | | |
|---|---|---|---|
| 7,719,997 | B2 | 5/2010 | Weinman |
| 8,942,085 | B1 | 1/2015 | Pani et al. |
| 9,225,628 | B2 | 12/2015 | Zahavi |
| 9,367,366 | B2 | 6/2016 | Xiong et al. |

(Continued)

FOREIGN PATENT DOCUMENTS

| | | | |
|---|---|---|---|
| CN | 101127689 | B | 10/2010 |
| CN | 102714628 | B | 11/2015 |

(Continued)

*Primary Examiner* — Djenane M Bayard
(74) *Attorney, Agent, or Firm* — Banner & Witcoff, Ltd.

(57) ABSTRACT

Systems and methods are disclosed for optimizing network routing and data processing through dynamic route optimization. The invention features a dynamic route optimization engine that uses real-time performance metrics such as latency, bandwidth availability, memory utilization, CPU load, and throughput capacity. It allows for rule-based configurations, enabling custom parameters for transaction processing, data retrieval, and user authorization. Integration with network monitoring tools provides continuous visibility into network performance. The system supports multi-cloud and hybrid cloud environments, dynamically selecting optimal paths based on real-time conditions and regulatory compliance. Predictive analytics anticipate network congestion, allowing proactive routing adjustments. Adaptive algorithms learn from past conditions to optimize performance continuously. Scalability is achieved through automated updates to routing tables and security groups. The invention reduces latency and ensuring efficient data transfer, providing a cost-effective and reliable solution for modern network management, addressing a long-standing need for adaptability and efficiency in network routing.

20 Claims, 7 Drawing Sheets

(51) Int. Cl.
*H04L 43/062* (2022.01)
*H04L 45/03* (2022.01)

(58) Field of Classification Search
CPC ..... H04L 63/1441; H04L 67/02; H04L 67/52; H04L 67/125; H04L 1/0041; H04L 67/34; H04L 67/60; H04L 1/0002; H04L 1/18; H04L 5/0064; H04L 67/306; H04L 1/0009; H04L 67/562; H04L 67/566; H04L 9/3236; H04L 9/3213; H04L 9/3247; H04L 1/0076; H04L 63/029; H04L 1/16; H04L 1/1854; H04L 1/1867; H04L 1/1874; H04L 27/0014; H04L 41/0631; H04L 49/70; H04L 5/0008; H04L 69/08; H04L 9/0825; H04L 9/0866; H04L 9/0894; H04L 9/32; H04L 63/1425; H04L 63/20; H04L 2463/141; H04L 63/1416; H04L 63/1483; H04L 67/535; H04L 67/10; H04L 67/561; H04L 69/329; H04L 67/62; H04L 63/1408; H04L 63/145; H04L 63/0227; H04L 63/102; H04L 63/164; H04L 63/166; H04L 67/63; H04L 63/0464; H04L 9/0662; H04L 9/3297; H04L 9/34

See application file for complete search history.

(56) References Cited

U.S. PATENT DOCUMENTS

2016/0127253 A1* 5/2016 Patel ........................ H04L 45/14 709/226
2018/0367445 A1* 12/2018 Bajaj ..................... H04L 41/142
2022/0029906 A1* 1/2022 Mahesh .................. H04L 41/40
2023/0145097 A1* 5/2023 Kiran .................. H04L 47/2483 370/235
2024/0296369 A1* 9/2024 Stockert ................. G06N 10/80

FOREIGN PATENT DOCUMENTS

CN 105357124 A 2/2016
CN 106533960 A 3/2017
CN 108781398 B 8/2019
CN 107579922 B 3/2020
CN 108401015 B 10/2020
CN 108366089 B 12/2020
CN 112350949 A 2/2021
CN 110493131 B 6/2021
CN 111464611 B 7/2022
CN 112346854 B 2/2023
CN 112004239 B 11/2023
EP 3053055 B1 7/2018
JP 4606333 B2 1/2011
JP 2013168934 A 8/2013

* cited by examiner

Sample System Architecture Diagram

Sample Class Diagram

Sample Architecture Diagram

OPTIMIZING NETWORK ROUTING AND DATA PROCESSING WITH DYNAMIC ROUTE OPTIMIZATION

TECHNICAL FIELD

The present invention pertains to the field of computer networking and network optimization technologies. More specifically, it involves advanced systems and methods for dynamic route optimization and data processing in heterogeneous network environments. The invention addresses issues related to real-time network performance enhancement, efficient resource utilization, and compliance with regulatory requirements by leveraging sophisticated routing algorithms and real-time data metrics.

DESCRIPTION OF THE RELATED ART

Modern enterprises rely heavily on their network infrastructures to support a wide range of applications, from critical business operations to customer-facing services. However, traditional network architectures often suffer from several inefficiencies and limitations that can significantly impact performance and operational costs. One major issue is the static configuration of network routes and data processing paths. These configurations are typically established during the initial design phase based on anticipated network conditions and user requirements. However, these conditions can change dynamically, and static configurations are unable to adapt, leading to suboptimal performance and increased latency.

In static network architectures, routing decisions are made based on fixed parameters, which means that the same routes are used regardless of the current network load or traffic conditions. This can result in network congestion during peak usage times, causing delays and degraded performance. For instance, an institution processing global transactions might experience significant delays during high-traffic periods because static routes do not account for real-time variations in network conditions. Consequently, this can lead to customer dissatisfaction and potential losses.

Another significant problem is the lack of real-time visibility into network performance metrics. Traditional network management tools often provide limited or no real-time data on critical metrics such as memory utilization, CPU load, throughput capacity, and bandwidth availability. Without this real-time data, network administrators cannot make informed decisions to optimize routing paths or allocate resources efficiently. This lack of visibility makes it challenging to identify and address network bottlenecks promptly, further exacerbating performance issues.

The heterogeneity of modern network environments adds another layer of complexity. Today's networks often comprise a mix of on-premises infrastructure, public cloud services, and edge computing resources. Each of these components has unique characteristics and performance profiles, making it difficult to manage data transfer and processing effectively. Traditional static routing methods are not equipped to handle this diversity, leading to inefficient use of resources and increased operational costs. For example, data might be routed through a high-latency path because the static configuration does not consider more optimal routes available in real-time.

Compliance with regulatory requirements such as data sovereignty laws poses additional challenges. These regulations may require that certain data be processed in specific geographical locations or follow particular routing paths to ensure compliance. Traditional network architectures with static routing configurations cannot dynamically adjust to meet these regulatory demands, increasing the risk of non-compliance. Non-compliance can result in legal consequences and reputational damage for enterprises.

Furthermore, the static nature of traditional network architectures limits their ability to prioritize critical transactions or applications. In environments where certain operations must be prioritized, static routes cannot dynamically adjust to ensure these priorities are met. This can lead to significant delays in processing high-priority transactions, which is particularly problematic for time-sensitive applications such as trading platforms or emergency response systems.

Traditional network architectures also face challenges in optimizing resource utilization. Fixed routing paths often lead to inefficient use of network resources, such as bandwidth and processing power. For example, during periods of low traffic, resources may be underutilized, while during peak times, the same resources may become overwhelmed. This imbalance can lead to higher operational costs as enterprises may need to over-provision their infrastructure to handle peak loads, resulting in wasted resources during off-peak periods.

The inability to dynamically adjust routing paths also affects the scalability of traditional network architectures. As network demands grow, static configurations become increasingly inadequate to handle the increased load. Enterprises must frequently update their routing tables manually, which is time-consuming and prone to errors. This lack of scalability hinders the ability of enterprises to expand their network operations efficiently and cost-effectively.

Security is another critical concern that is not adequately addressed by static network architectures. As cyber threats become more sophisticated, the need for dynamic security measures that can adapt in real-time is essential. Static routes do not account for potential security threats or vulnerabilities that may arise, making networks more susceptible to attacks. This lack of adaptive security measures can lead to data breaches, loss of sensitive information, and significant reputational damage.

Additionally, the increasing complexity of network environments and the growing demand for high-speed data processing place significant stress on traditional network architectures. The static nature of these systems cannot keep pace with the rapid advancements in technology and the evolving needs of modern enterprises. This gap between the capabilities of traditional network architectures and the requirements of contemporary network environments highlights the need for more flexible and adaptive solutions.

The long-felt and unmet need for a solution that addresses these challenges is evident. Enterprises have struggled with the limitations of static network configurations for years, leading to inefficiencies, higher operational costs, and compliance risks. The dynamic nature of modern network environments requires a more adaptive approach to routing and data processing. A solution that provides real-time visibility into network performance, dynamically adjusts routing paths based on current conditions, and integrates compliance and security considerations into routing decisions is essential. Such a solution would empower enterprises to optimize their network operations, enhance performance, reduce costs, and ensure compliance with regulatory requirements, meeting a longstanding need in the industry.

SUMMARY OF THE INVENTION

The present invention is a sophisticated system and method designed to optimize network routing and data processing through dynamic route optimization. This system addresses several key challenges associated with traditional static network architectures, providing a more adaptive and efficient solution for managing network resources. By leveraging real-time data metrics and advanced routing algorithms, the invention ensures optimal performance, resource utilization, and adherence to regulatory requirements. It integrates multiple components, each playing a role in enhancing the overall efficiency and effectiveness of network operations.

At the core of the invention is a dynamic route optimization engine. This engine continuously monitors network conditions using real-time data on various performance metrics, such as latency, bandwidth availability, memory utilization, CPU load, and throughput capacity. By analyzing this data, the engine can make informed decisions about the most efficient routing paths for data transfer and processing. This real-time adaptability allows the network to respond to changing conditions promptly, avoiding congestion and ensuring smooth and efficient operations.

One of the key features of the invention is its rule-based configuration capability. Enterprises and users can define custom rules and parameters that govern transaction processing, data retrieval, and user authorization. These rules can take into account factors such as cost calculations, transaction priorities, application inventories, and routing table configurations. By allowing users to customize these parameters, the system can tailor its operations to meet specific business needs and objectives. This flexibility ensures that the network can efficiently handle a wide range of scenarios, from high-priority financial transactions to routine data transfers.

The invention also includes integration with network monitoring tools. These tools provide real-time visibility into essential network performance metrics, which enable making informed routing decisions. For example, if the monitoring tools detect high CPU usage on a particular server, the optimization engine can redirect traffic to other servers with more available capacity. This integration ensures that the network can continuously optimize its operations based on the latest performance data, preventing bottlenecks and maintaining high levels of efficiency.

Support for multi-cloud and hybrid cloud environments is another significant aspect of the invention. The system can seamlessly manage data transfer and processing across diverse infrastructure platforms, dynamically selecting the most appropriate cloud provider or on-premises resource based on user-defined rules and real-time network conditions. This capability enhances the flexibility and efficiency of network operations, ensuring that data is always processed in the most suitable environment. For example, data that needs to comply with specific regional regulations can be routed to a cloud provider that meets those requirements, while other data can be processed on less expensive or more performant platforms.

Compliance and security considerations are integral to the invention. The system incorporates these factors into its routing decisions, automatically routing data through compliant paths and enforcing security protocols. This ensures that all data transfer and processing activities adhere to regulatory requirements and organizational security policies. For instance, sensitive financial data can be routed through highly secure and compliant channels, while less sensitive data can be processed through more cost-effective routes. This dynamic adjustment capability reduces the risk of non-compliance and enhances data security.

The invention also features predictive analytics capabilities. By analyzing historical data and identifying trends, the system can anticipate network congestion and other potential issues before they occur. This proactive approach allows the optimization engine to adjust routing paths in advance, preventing performance degradation and ensuring a smooth and reliable network experience. Predictive analytics helps in maintaining optimal network performance even during periods of high demand or unexpected events.

Scalability is another aspect of the invention. The system is designed to handle varying workloads and network demands, making it suitable for enterprises of all sizes. As network demands grow, the system can scale its operations accordingly ensuring that performance and efficiency are maintained. This scalability is achieved through automated updates to routing tables and security groups, which adapt to changing network conditions without the need for manual intervention. This feature reduces the administrative burden on network managers and ensures continuous optimization.

The invention's adaptive algorithms are another key feature. These algorithms continuously learn from past network conditions and predict future trends, enabling the system to make proactive adjustments to routing paths. This adaptive capability ensures that the network can respond to unexpected events, such as sudden spikes in traffic or hardware failures, by dynamically rerouting traffic to maintain performance levels. This adaptability enhances the resilience and reliability of network operations.

Cost optimization is also a significant benefit of the invention. By making intelligent routing decisions based on real-time data and user-defined rules, the system can optimize data transfer costs without compromising performance or security. This cost-effective approach helps enterprises reduce operational expenses while maintaining high levels of network performance. For example, the system can route data through less expensive paths during periods of low traffic, ensuring efficient use of network resources.

Enhanced user experience is a key outcome of the invention. By improving network performance and reliability, the system ensures that users receive a high level of service quality. Faster transaction processing, reduced latency, and efficient data retrieval contribute to a better user experience, leading to increased satisfaction and loyalty. This enhanced user experience is particularly important for customer-facing applications and services, where performance and reliability are critical to user satisfaction.

Overall, the invention provides a comprehensive solution to the challenges of traditional network architectures. By leveraging dynamic route optimization, real-time data metrics, and advanced routing algorithms, it ensures optimal network performance, efficient r resource utilization, and adherence to regulatory requirements. The system's flexibility, adaptability, and scalability make it suitable for a wide range of network environments, from small enterprises to large global networks. This invention addresses a long-felt and unmet need for a more adaptive and efficient approach to network routing and data processing, providing significant benefits to enterprises in terms of performance, cost savings, and user satisfaction.

Sample components of the present invention include one or more of:

a. Rule-Based Configuration: Enterprises and users can define rules and parameters governing transaction processing, data retrieval, and user authorization. These rules can encompass factors such as cost calculations, transaction priorities, application inventories, and routing table configurations. By allowing users to customize these parameters, the system can tailor its operations to meet specific business needs and objectives. For example, a financial institution may prioritize high-value transactions to ensure they are processed with minimal latency. Rules can be adjusted based on real-time conditions, allowing for flexible and responsive network management.

b. Dynamic Route Optimization Engine: The core of the solution is a sophisticated routing engine that utilizes real-time network metrics and user-defined rules to dynamically optimize routing paths for data transfer and processing. This engine considers factors such as latency, bandwidth availability, data availability, and compliance requirements to select the most efficient route for each transaction. By dynamically adjusting routes based on current network conditions, the system ensures optimal resource utilization and performance. For instance, during peak traffic times, the engine might reroute traffic to less congested paths to maintain performance levels. The engine can also predict future network conditions based on historical data, enabling proactive routing adjustments.

c. Integration with Network Monitoring Tools: The solution integrates with network monitoring tools to gather real-time data on network performance metrics such as memory utilization, CPU load, throughput capacity, and bandwidth availability. This data enables making informed routing decisions. For example, if the monitoring tools detect high CPU usage on a particular server, the routing engine can divert traffic to other servers with more available capacity, ensuring smooth and efficient processing. Real-time monitoring also allows for rapid identification and resolution of network issues, minimizing downtime and improving overall network reliability.

d. Multi-Cloud and Hybrid Cloud Support: The solution supports multi-cloud and hybrid cloud environments, allowing enterprises to seamlessly manage data transfer and processing across diverse infrastructure platforms. By dynamically selecting the most appropriate cloud provider or on-premises resource based on user-defined rules and network conditions, the solution optimizes resource utilization and reduces latency. For example, data that needs to comply with specific regional regulations can be routed to a cloud provider that meets those requirements, while other data can be processed on less expensive or more performant platforms. This flexibility enhances the efficiency and cost-effectiveness of network operations.

e. Compliance and Security Considerations: The solution incorporates compliance and security considerations into routing decisions, ensuring that data transfer and processing activities adhere to regulatory requirements and security policies. By automatically routing data through compliant paths and enforcing security protocols, the solution mitigates compliance risks and enhances data security. For instance, sensitive financial data can be routed through highly secure and compliant channels, while less sensitive data can be processed through more cost-effective routes. The system can also dynamically adjust routes to ensure ongoing compliance with changing regulations.

Sample unique aspects of the invention include:

a. Dynamic Route Optimization: The system makes real-time adjustments to network routing and data processing paths based on changing conditions. This ensures that the most efficient routes are always used, improving performance and reducing costs. Dynamic route optimization allows for continuous adaptation to network conditions, ensuring optimal performance even as network demands fluctuate.

b. Adaptive Algorithms: Intelligent routing algorithms are employed to optimize performance and resource allocation continuously. These algorithms can learn from past network conditions and predict future trends to make proactive adjustments. Adaptive algorithms can also respond to unexpected network events, such as sudden spikes in traffic or hardware failures, by dynamically rerouting traffic to maintain performance levels.

c. Network Monitoring Integration: The integration with monitoring tools provides real-time data on network performance metrics, allowing the system to make informed and timely routing decisions. Continuous monitoring ensures that the system can quickly detect and respond to network issues, minimizing the impact on performance and reliability.

d. Multi-Cloud Support: The solution can manage resources across multiple cloud environments, providing flexibility and efficiency. It ensures that data is always processed in the most suitable environment based on current conditions and predefined rules. Multi-cloud support allows enterprises to take advantage of the unique strengths of different cloud providers, optimizing performance and cost-effectiveness.

e. Compliance and Security: By incorporating compliance and security protocols into routing decisions, the solution ensures that all data processing activities adhere to regulatory requirements, mitigating risks and enhancing security. Compliance features can be tailored to meet specific regulatory requirements, ensuring that data is handled in a secure and compliant manner.

f. Cost Optimization: The system optimizes data transfer costs by making intelligent routing decisions, selecting the most cost-effective paths without compromising performance or security. Cost optimization features can help enterprises reduce operational expenses while maintaining high levels of performance and reliability.

g. User-Defined Rules: Users can define custom rules and parameters for transaction processing, data retrieval, and user authorization, allowing for tailored operations that meet specific business needs. Customizable rules provide flexibility and control, enabling enterprises to optimize network operations based on their unique requirements.

h. Latency Reduction: Optimized routing paths minimize latency, ensuring faster transaction processing and data retrieval. Latency reduction features enhance the user experience by providing faster and more reliable network performance.

i. Scalability: The architecture is scalable, capable of handling varying workloads and network demands. This ensures that the system can grow with the organization and adapt to increasing network traffic and complexity. Scalability features ensure that the system can maintain high levels of performance even as network demands increase.

j. Automated Routing Updates: The system automatically updates routing tables and security groups to adapt to changing network conditions, ensuring continuous optimization and performance. Automated updates reduce the need for manual intervention, enhancing efficiency and reliability.

k. Enhanced User Experience: Improved network performance and reliability lead to enhanced user satisfaction, as transactions and data retrievals are faster and more efficient. Enhanced user experience features ensure that users receive a high level of service quality, leading to increased satisfaction and loyalty.

l. Predictive Analytics: The use of predictive analytics allows the system to anticipate network congestion and proactively adjust routing paths, preventing performance degradation before it occurs. Predictive analytics features enable the system to identify potential issues before they impact performance, ensuring a smooth and reliable network experience.

By implementing this context-based routing and data processing system, enterprises can achieve significant improvements in network performance In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a method for optimizing network routing and data processing comprises the steps of defining, by a rule-based configuration component, custom rules and parameters for transaction processing, data retrieval, and user authorization, including cost calculations, transaction priorities, application inventories, and routing table configurations. The method includes monitoring, by a network monitoring tool, real-time network performance metrics, including latency, bandwidth availability, memory utilization, CPU load, and throughput capacity. It involves analyzing, by a dynamic route optimization engine, the real-time network performance metrics to determine the most efficient routing paths for data transfer and processing. The method further includes dynamically adjusting, by the dynamic route optimization engine, routing paths based on the analyzed real-time network performance metrics and the configured custom rules and parameters. Integrating, by an integration component, with network monitoring tools provides continuous visibility into network performance metrics and informs routing decisions. The method supports, by a multi-cloud and hybrid cloud management component, multi-cloud and hybrid cloud environments by dynamically selecting the most appropriate cloud provider or on-premises resource based on the configured custom rules and real-time network conditions. Incorporating, by a compliance and security component, compliance and security considerations into routing decisions automatically routes data through compliant paths and enforces security protocols. Utilizing, by a predictive analytics component, predictive analytics analyzes historical data, identifies trends, and anticipates network congestion and potential issues before they occur. The method scales, by a scalability component, the network operations to handle varying workloads and network demands by automatically updating routing tables and security groups based on changing network conditions. Continuously learning, by adaptive algorithms, from past network conditions and predicting future trends proactively adjusts routing paths. The method optimizes, by a cost optimization component, data transfer costs by making intelligent routing decisions based on real-time data and the configured custom rules. Enhancing, by a user experience component, user experience is achieved by improving network performance, reducing latency, and ensuring efficient data retrieval and transaction processing.

In some arrangements, a system for optimizing network routing and data processing comprises a dynamic route optimization engine configured to analyze real-time network performance metrics and adjust routing paths to optimize data transfer and processing. The dynamic route optimization engine is further configured to analyze metrics selected from the group consisting of latency, bandwidth availability, memory utilization, CPU load, and throughput capacity, and adjust routing paths based on the analyzed metrics to minimize latency and maximize throughput.

In some arrangements, the system includes a rule-based configuration component configured to allow users to define custom rules and parameters for transaction processing, data retrieval, and user authorization. The rule-based configuration component is further configured to define rules for cost calculations, transaction priorities, application inventories, and routing table configurations, and set parameters that govern the behavior of network operations.

In some arrangements, the system comprises network monitoring tools configured to continuously monitor real-time network performance metrics. The network monitoring tools are further configured to monitor performance metrics selected from the group consisting of latency, bandwidth availability, memory utilization, CPU load, and throughput capacity, and collect metrics necessary for analysis by the dynamic route optimization engine.

In some arrangements, the system includes an integration component configured to facilitate seamless communication and data exchange between the dynamic route optimization engine and the network monitoring tools. The integration component is further configured to integrate with network monitoring tools to provide continuous visibility into network performance metrics and ensure that the dynamic route optimization engine receives accurate and current data.

In some arrangements, the system comprises a multi-cloud and hybrid cloud management component configured to manage data transfer and processing across multiple cloud environments. The multi-cloud and hybrid cloud management component is further configured to manage data transfer across different cloud providers and on-premises resources, and select the most suitable cloud provider or on-premises resource based on real-time network conditions and configured rules.

In some arrangements, the system includes a compliance and security component configured to ensure that all data transfer and processing activities adhere to regulatory requirements and organizational security policies. The compliance and security component is further configured to enforce security protocols to maintain data security, and ensure compliance by routing data through compliant paths.

In some arrangements, the system comprises a predictive analytics component configured to leverage historical data to analyze trends and anticipate network congestion and other potential issues before they occur. The predictive analytics component is further configured to analyze historical data to identify patterns and trends, and anticipate issues by forecasting future network conditions.

In some arrangements, the system includes a scalability component configured to dynamically scale network operations to handle varying workloads and network demands. The scalability component is further configured to scale operations by adjusting network capacity to meet demand, and update routing tables and security groups based on real-time changes in network conditions.

In some arrangements, the system comprises adaptive algorithms configured to continuously learn from past network conditions and predict future trends. The adaptive algorithms are further configured to learn from historical data to understand previous network behaviors, and predict future trends to make proactive adjustments to routing paths.

In some arrangements, the system includes a cost optimization component configured to reduce operational expenses by optimizing data transfer costs. The cost optimization component is further configured to optimize costs by making routing decisions based on cost-effectiveness, and select the most economical routes without compromising performance.

In some arrangements, the system comprises a user experience component configured to enhance the overall user experience by improving network performance, reducing latency, and ensuring efficient data retrieval and transaction processing. The user experience component is further configured to enhance performance by optimizing network efficiency, and reduce latency to minimize delays in data transmission.

In some arrangements, the dynamic route optimization engine is further configured to provide real-time alerts to network administrators about significant changes in network performance metrics, including potential bottlenecks, unusual traffic patterns, or security threats, enabling prompt intervention and resolution.

In some arrangements, the rule-based configuration component is further configured to support the creation and management of multiple rule sets that can be applied based on different network conditions and operational requirements, allowing for adaptive policy enforcement and flexible network management.

In some arrangements, the network monitoring tools are further configured to generate detailed performance reports at predefined intervals, providing comprehensive insights into network trends, performance anomalies, and potential issues, thus facilitating informed decision-making and strategic planning.

In some arrangements, the integration component is further configured to support integration with third-party network management and monitoring tools to enhance data visibility and analysis capabilities, ensuring a holistic view of network performance and enabling seamless interoperability with existing infrastructure.

In some arrangements, the multi-cloud and hybrid cloud management component is further configured to implement load balancing strategies to distribute network traffic evenly across multiple cloud environments, thereby optimizing resource utilization, preventing overloads, and enhancing overall network resilience.

In some arrangements, the compliance and security component is further configured to automatically update security protocols and compliance rules based on changes in regulatory requirements and threat landscapes, ensuring continuous adherence to legal standards and protection against evolving cyber threats.

In some arrangements, the predictive analytics component is further configured to utilize machine learning algorithms to improve the accuracy of trend analysis and issue anticipation, enabling the system to learn from historical data and continuously enhance its predictive capabilities.

In some arrangements, the scalability component is further configured to implement automated scaling policies that trigger adjustments in network capacity based on predefined performance thresholds, ensuring that network resources are dynamically allocated to meet fluctuating demands and maintain optimal service levels.

In some arrangements, the adaptive algorithms are further configured to optimize network routing paths by continuously refining their predictions through feedback loops that incorporate real-time performance data and historical trends, enhancing the efficiency and accuracy of the network optimization process.

In some arrangements, a method for optimizing network routing and data processing comprises the steps of defining, by a rule-based configuration component, custom rules and parameters for transaction processing, data retrieval, and user authorization, including cost calculations, transaction priorities, application inventories, and routing table configurations. The method also includes monitoring, by network monitoring tools, real-time network performance metrics, including latency, bandwidth availability, memory utilization, CPU load, and throughput capacity. Additionally, the method involves analyzing, by a dynamic route optimization engine, the real-time network performance metrics to determine the most efficient routing paths for data transfer and processing, with the analysis considering historical performance data and predefined optimization criteria. Furthermore, the method includes adjusting, by the dynamic route optimization engine, the routing paths based on the analyzed real-time network performance metrics and the defined custom rules and parameters to ensure optimal data flow and minimal network congestion. Integrating, by an integration component, with network monitoring tools to provide continuous visibility into network performance metrics and to inform routing decisions, ensuring synchronized operations across all monitoring and optimization tools, is also part of the method. Managing, by a multi-cloud and hybrid cloud management component, data transfer and processing across multiple cloud environments by dynamically selecting the most appropriate cloud provider or on-premises resource based on real-time network conditions and defined custom rules, ensuring data compliance and cost efficiency, is included as well. Ensuring, by a compliance and security component, that all data transfer and processing activities adhere to regulatory requirements and organizational security policies by automatically routing data through compliant paths and enforcing security protocols, maintaining data integrity and confidentiality, is another step. Utilizing, by a predictive analytics component, predictive analytics to analyze historical data, identify trends, and anticipate network congestion and potential issues before they occur, allowing for preemptive measures to mitigate identified risks, is also part of the method. Additionally, scaling, by a scalability component, the network operations to handle varying workloads and network demands by automatically updating routing tables and security groups based on changing network conditions, ensuring resource availability and optimal performance, is included. Learning, by adaptive algorithms, from past network conditions and predicting future trends to proactively adjust routing paths, continuously improving the accuracy and efficiency of the optimization engine, is another aspect of the method. Finally, optimizing, by a cost optimization component, data transfer costs by making intelligent routing decisions based on real-time data and defined custom rules, ensuring cost-effective network operations without compromising performance, and enhancing, by a user experience component, user experience by improving network performance, reducing latency, and ensuring efficient data retrieval and transaction processing, thus ensuring high levels of user satisfaction and system reliability, are also included.

In some arrangements, the method further comprises the step of providing, by the dynamic route optimization engine, real-time alerts to network administrators about significant changes in network performance metrics, including potential bottlenecks, unusual traffic patterns, or security threats, enabling prompt intervention and resolution. In some arrangements, the method further comprises the step of supporting, by the rule-based configuration component, the creation and management of multiple rule sets that can be applied based on different network conditions and operational requirements, allowing for adaptive policy enforcement and flexible network management. In some arrangements, the method further comprises the step of generating, by the network monitoring tools, detailed performance reports at predefined intervals, providing comprehensive insights into network trends, performance anomalies, and potential issues, thus facilitating informed decision-making and strategic planning. In some arrangements, the method further comprises the step of supporting, by the integration component, integration with third-party network management and monitoring tools to enhance data visibility and analysis capabilities, ensuring a holistic view of network performance and enabling seamless interoperability with existing infrastructure. In some arrangements, the method further comprises the step of implementing, by the multi-cloud and hybrid cloud management component, load balancing strategies to distribute network traffic evenly across multiple cloud environments, thereby optimizing resource utilization, preventing overloads, and enhancing overall network resilience. In some arrangements, the method further comprises the step of automatically updating, by the compliance and security component, security protocols and compliance rules based on changes in regulatory requirements and threat landscapes, ensuring continuous adherence to legal standards and protection against evolving cyber threats. In some arrangements, the method further comprises the step of utilizing, by the predictive analytics component, machine learning algorithms to improve the accuracy of trend analysis and issue anticipation, enabling the system to learn from historical data and continuously enhance its predictive capabilities. In some arrangements, the method further comprises the step of implementing, by the scalability component, automated scaling policies that trigger adjustments in network capacity based on predefined performance thresholds, ensuring that network resources are dynamically allocated to meet fluctuating demands and maintain optimal service levels.

In some arrangements, the method further comprises the steps of utilizing, by the predictive analytics component, machine learning algorithms to improve the accuracy of trend analysis and issue anticipation, enabling the system to learn from historical data and continuously enhance its predictive capabilities. The method also includes implementing, by the scalability component, automated scaling policies that trigger adjustments in network capacity based on predefined performance thresholds, ensuring that network resources are dynamically allocated to meet fluctuating demands and maintain optimal service levels.

In some arrangements, the method further comprises the steps of leveraging, by the dynamic route optimization engine, artificial intelligence and machine learning algorithms to enhance the decision-making processes for analyzing real-time network performance metrics and adjusting routing paths. The method also includes utilizing, by the predictive analytics component, artificial intelligence and machine learning to improve the accuracy of trend analysis and issue anticipation by learning from historical data and continuously enhancing predictive capabilities. Additionally, the method integrates, by the dynamic route optimization engine, quantum computing to analyze real-time network performance metrics with higher speed and accuracy, optimize decision-making processes by processing vast amounts of data simultaneously, and accelerate the learning process of the adaptive algorithms by enabling faster analysis of historical data and prediction of future trends.

In some arrangements, a dynamic route optimizing system for optimizing network routing and data processing comprises a dynamic route optimization engine configured to analyze real-time network performance metrics and adjust routing paths to optimize data transfer and processing. The dynamic route optimization engine further utilizes artificial intelligence and machine learning algorithms to enhance its decision-making processes. It is capable of analyzing metrics selected from the group consisting of latency, bandwidth availability, memory utilization, CPU load, and throughput capacity, and adjusts routing paths based on the analyzed metrics to minimize latency and maximize throughput.

The system includes a rule-based configuration component configured to allow users to define custom rules and parameters for transaction processing, data retrieval, and user authorization. This component is further configured to define rules for cost calculations, transaction priorities, application inventories, and routing table configurations, and to set parameters that govern the behavior of network operations.

Network monitoring tools are configured to continuously monitor real-time network performance metrics. These tools monitor performance metrics selected from the group consisting of latency, bandwidth availability, memory utilization, CPU load, and throughput capacity, and collect metrics necessary for analysis by the dynamic route optimization engine.

An integration component is configured to facilitate seamless communication and data exchange between the dynamic route optimization engine and the network monitoring tools. This component integrates with network monitoring tools to provide continuous visibility into network performance metrics and ensures that the dynamic route optimization engine receives accurate and current data.

A multi-cloud and hybrid cloud management component is configured to manage data transfer and processing across multiple cloud environments. This component manages data transfer across different cloud providers and on-premises resources, and selects the most suitable cloud provider or on-premises resource based on real-time network conditions and configured rules.

A compliance and security component is configured to ensure that all data transfer and processing activities adhere to regulatory requirements and organizational security policies. This component enforces security protocols to maintain data security and ensures compliance by routing data through compliant paths.

A predictive analytics component is configured to leverage historical data to analyze trends and anticipate network congestion and other potential issues before they occur. This component analyzes historical data to identify patterns and trends and anticipates issues by forecasting future network conditions.

A scalability component is configured to dynamically scale network operations to handle varying workloads and network demands. This component scales operations by adjusting network capacity to meet demand and updates routing tables and security groups based on real-time changes in network conditions.

Adaptive algorithms are configured to continuously learn from past network conditions and predict future trends. These algorithms automatically learn from historical data to understand previous network behaviors and automatically predict future trends to make proactive adjustments to routing paths.

A cost optimization component is configured to reduce operational expenses by optimizing data transfer costs. This component optimizes costs by making routing decisions based on cost-effectiveness and selects the most economical routes without compromising performance.

Finally, a user experience component is configured to enhance the overall user experience by improving network performance, reducing latency, and ensuring efficient data retrieval and transaction processing. This component enhances performance by optimizing network efficiency and reduces latency to minimize delays in data transmission.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. One or more of the foregoing steps can be combined or omitted as desired. The steps and functionalities for any given implementation may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

DETAILED DESCRIPTION

Figure 1:
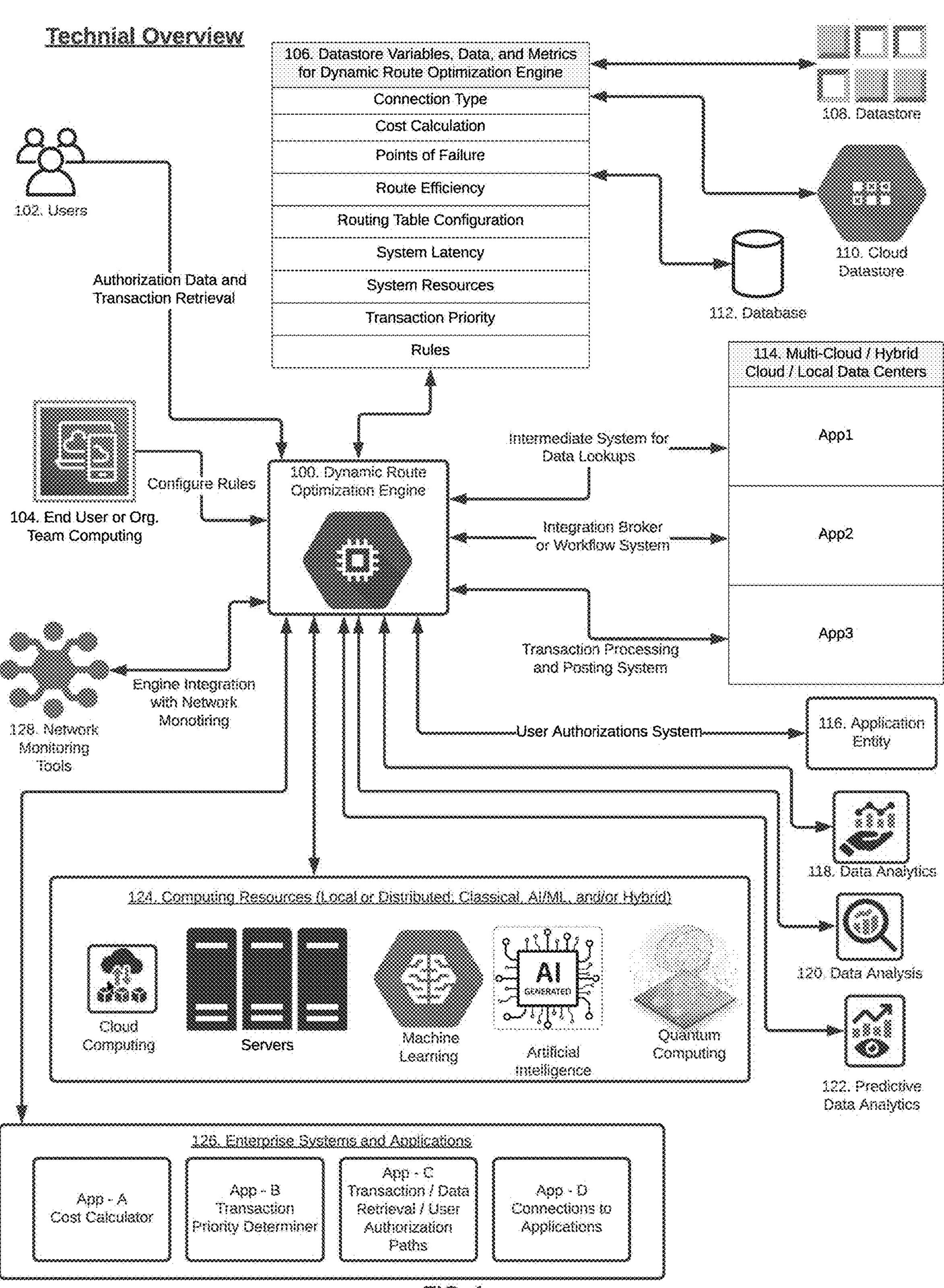
FIG. 1 provides a technology overview diagram for the dynamic route optimization engine, depicting the various datastore variables, data, and metrics that contribute to optimizing network routing. The diagram includes components such as connection types, cost calculations, points of failure, route efficiency, system latency, system resources, and transaction priorities, alongside the dynamic route optimization engine and its interaction with users, network monitoring tools, multi-cloud and hybrid cloud environments, and various applications.

At a high level, the invention describes complex systems and techniques for optimizing network routing and data processing using dynamic route optimization. This strategy overcomes key issues with traditional static network architectures, resulting in a more adaptable and efficient solution for managing network resources. The invention improves performance, optimizes resource use, and maintains regulatory compliance by leveraging real-time data metrics and innovative routing algorithms.

The dynamic route optimization engine is important to the invention, since it continuously checks network circumstances utilizing real-time data on performance indicators like latency, bandwidth availability, memory utilization, CPU load, and throughput capacity. This engine analyzes the acquired data in order to make informed decisions about the most efficient data transport and processing routes. The system's real-time adaptability enables the network to respond quickly to changing conditions, preventing congestion and assuring smooth operations.

The rule-based configuration capability is a key aspect of the invention, allowing companies and users to set unique rules and parameters that govern transaction processing, data retrieval, and user authorization. These rules may include things like cost estimates, transaction priority, application inventories, and routing table settings. Customizing these settings allows the system to adjust its operations to individual company demands and objectives, effectively handling a wide range of scenarios from high-priority financial transactions to everyday data transfers.

The idea also works with network monitoring tools to provide real-time visibility into key network performance parameters. This integration is critical for making accurate routing selections. For example, if the monitoring tools detect excessive CPU utilization on a specific server, the optimization engine can route traffic to other servers with higher available capacity. Continuous optimization based on the most recent performance data helps to avoid bottlenecks and maintain high levels of efficiency.

Supporting multi-cloud and hybrid cloud settings is another key feature of the technology. The system can smoothly manage data flow and processing across several infrastructure platforms. It dynamically selects the best cloud provider or on-premise resource based on user-defined rules and real-time network circumstances. This adaptability guarantees that data is always processed in the most appropriate environment, resulting in increased operational efficiency. For example, data that must adhere to certain regional standards can be directed to a compliant cloud provider, whilst other data can be processed on less expensive or higher-performing platforms.

The system is designed with compliance and security in mind. The innovation includes these considerations into its routing decisions, automatically routing data via compliant paths and enforcing security measures. This strategy ensures that all data transport and processing activities comply with regulatory standards and organizational security rules. Sensitive financial data can be sent through safe and regulated channels, while less sensitive data can take a more cost-effective path. This dynamic adjustment capability decreases the risk of noncompliance and improves data security.

The concept employs predictive analytics, which analyzes previous data to find trends and anticipate network congestion and other potential problems before they arise. This proactive strategy enables the optimization engine to adjust routing patterns in advance, eliminating performance deterioration and delivering a seamless and dependable network experience. Predictive analytics can help maintain optimal network performance even during peak demand periods or unforeseen events.

Scalability is an important feature of the invention, which is designed to handle variable workloads and network demands, making it suited for businesses of all sizes. As network demands increase, the system can scale its operations accordingly, ensuring that performance and efficiency remain intact. Routing table and security group changes are automated so that they respond to changing network conditions without requiring manual intervention, lowering administrative overhead and assuring ongoing optimization.

Adaptive algorithms are another important aspect of the idea. These algorithms continuously learn from previous network circumstances and forecast future patterns, allowing for proactive routing path modifications. This feature ensures that the network can respond to unforeseen occurrences, such as sudden surges in traffic or hardware breakdowns, by dynamically rerouting traffic to preserve performance. The system's adaptability improves the network's resilience and reliability.

Cost optimization is a significant advantage supplied by the invention. By making intelligent routing decisions based on real-time data and user-defined rules, the system can reduce data transmission costs while maintaining performance and security. This strategy enables businesses to decrease operational costs while maintaining high network performance levels. For example, during low traffic periods, the system can route data over less expensive pathways, making better use of network resources.

An improved user experience is one of the invention's primary outcomes. By boosting network performance and dependability, the system ensures that users obtain high-quality services. Faster transaction processing, lower latency, and efficient data retrieval all contribute to a better user experience, resulting in more satisfaction and loyalty. This is especially relevant for customer-facing apps and services, where performance and reliability are critical to user happiness. Overall, the invention addresses the limits of standard network topologies, providing significant benefits in terms of performance, cost savings, and user happiness.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications-internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models—Megatron: A large, powerful transformer model designed for natural language processing tasks. (6) IBM AI Models-Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

If desired, as a skilled artisan will understand from the detailed disclosure infra, artificial intelligence (AI) and machine learning (ML) can be integrated into the invention detailed in the patent application on optimizing network routing and data processing with dynamic route optimization in several key ways. One significant application is in predictive analytics, where AI and ML analyze historical data to identify trends and predict future network conditions. This predictive capability allows the system to anticipate potential network congestion and other issues before they occur, enabling proactive adjustments to routing paths. For example, machine learning algorithms can analyze patterns in network usage data to predict periods of high traffic and adjust routing paths accordingly to prevent congestion.

Adaptive algorithms powered by machine learning are another critical integration. These algorithms continuously learn from past network conditions and predict future trends. By dynamically adjusting routing paths in real-time based on the learned data, the system enhances its ability to adapt to unexpected network events, such as sudden spikes in traffic or hardware failures. This continuous learning process improves the efficiency and accuracy of the network optimization engine over time.

Real-time data analysis is another area where AI can significantly enhance the system's capabilities. By leveraging AI, the system can analyze real-time network performance metrics, such as latency, bandwidth availability, memory utilization, CPU load, and throughput capacity, making faster and more accurate decisions regarding the most efficient routing paths. This real-time adaptability helps maintain high network performance and efficiency.

The rule-based configuration component can also benefit from machine learning by analyzing the effectiveness of different rules and parameters over time. The system can use this analysis to recommend adjustments to the custom rules and parameters, improving transaction processing, data retrieval, and user authorization based on evolving network conditions and user needs.

AI can enhance the compliance and security components by automatically updating security protocols and compliance rules based on changes in regulatory requirements and threat landscapes. Machine learning models can detect unusual traffic patterns or potential security threats, enabling the system to take preemptive measures to protect data integrity and maintain compliance.

Cost optimization is another significant benefit of integrating AI. By making intelligent routing decisions based on real-time data and user-defined rules, AI can help optimize data transfer costs. Machine learning models can analyze the cost-effectiveness of different routing paths and select the most economical routes without compromising performance, helping enterprises reduce operational expenses.

Machine learning can also assist in managing the scalability component by predicting future network demands and automatically scaling network operations to handle varying workloads. By analyzing trends in network usage, the system can adjust routing tables and security groups to ensure that resources are dynamically allocated to meet fluctuating demands.

AI can improve the overall user experience by optimizing network performance, reducing latency, and ensuring efficient data retrieval and transaction processing. Machine learning models can analyze user behavior and network performance metrics to identify areas for improvement, leading to a more responsive and reliable network service.

Incorporating AI and ML into the dynamic route optimization engine and its associated components significantly enhances the system's ability to adapt to real-time conditions, improve performance, ensure compliance and security, and reduce costs. This integration provides a comprehensive solution for managing modern network environments effectively and efficiently.

Additionally, quantum computing can be utilized in combination with classical computing to implement the present invention, if desired. In particular, quantum computing, with its ability to perform complex calculations at unprecedented speeds, can significantly enhance the present invention's capabilities in optimizing network routing and data processing.

For example, quantum computing can vastly improve the efficiency and accuracy of predictive analytics within the dynamic route optimization engine. Quantum algorithms can analyze vast amounts of historical data much faster than classical computers, identifying trends and predicting future network conditions with greater precision. This enhanced predictive capability allows the system to anticipate network congestion and other issues more effectively, enabling proactive adjustments to routing paths and minimizing performance degradation.

The use of quantum computing can also optimize the adaptive algorithms employed by the system. Quantum machine learning algorithms can process and learn from past network conditions more quickly and accurately than traditional methods. This accelerated learning process enables the system to make more timely and precise adjustments to routing paths in response to changing network conditions, improving overall network resilience and reliability.

Real-time data analysis can benefit enormously from quantum computing. The dynamic route optimization engine can leverage quantum processors to analyze real-time network performance metrics such as latency, bandwidth availability, memory utilization, CPU load, and throughput capacity at much higher speeds. This rapid analysis allows the system to make instantaneous, data-driven decisions regarding the most efficient routing paths, ensuring optimal network performance and efficiency.

Quantum computing can enhance the rule-based configuration component by optimizing the process of defining and adjusting custom rules and parameters. Quantum algorithms can evaluate the effectiveness of different rules and parameters more efficiently, providing recommendations for adjustments that better align with evolving network conditions and user needs. This optimization ensures that transaction processing, data retrieval, and user authorization are always handled in the most effective manner.

The compliance and security components of the system can also be significantly improved with quantum computing. Quantum cryptography offers a higher level of security for data transfer and processing, ensuring that all activities adhere to regulatory requirements and organizational security policies. Quantum algorithms can detect security threats and anomalies more rapidly, enabling the system to take preemptive measures to protect data integrity and compliance.

Cost optimization can be taken to new heights with quantum computing. Quantum algorithms can evaluate a multitude of routing paths simultaneously, identifying the most cost-effective routes without compromising performance. This capability helps enterprises minimize operational expenses by selecting the most economical data transfer paths in real time.

Scalability is another area where quantum computing can make a substantial impact. Quantum processors can handle and analyze larger datasets more efficiently, allowing the system to scale network operations dynamically to meet varying workloads and demands. This scalability ensures that the network can grow and adapt without compromising performance or efficiency.

Finally, quantum computing can significantly enhance the overall user experience. By improving the speed and accuracy of network performance optimizations, quantum computing ensures faster transaction processing, reduced latency, and more efficient data retrieval. This leads to a more responsive and reliable network service, enhancing user satisfaction and loyalty.

In summary, integrating quantum computing into the dynamic route optimization engine and its associated components can greatly enhance the system's ability to process data, predict network conditions, adapt to changes, ensure security, optimize costs, scale operations, and improve the user experience. The advanced computational capabilities of quantum computing provide a comprehensive solution for managing complex and dynamic network environments effectively and efficiently.

FIG. 1, by way of non-limiting disclosure, depicts a highly sophisticated system designed for optimizing network routing and data processing. Dynamic Route Optimization Engine (100) serves as the primary decision-maker, orchestrating the entire process of managing data flows across the network. This engine employs advanced algorithms, real-time data analytics, and user-defined rules to optimize the efficiency and effectiveness of network operations.

At a high level, core functions and operations of the engine include: 1. Data Collection and Input Integration: The Dynamic Route Optimization Engine continuously collects data from multiple sources. This includes inputs from users (102), such as authorization data and transaction information, and real-time performance metrics from various components within the system. It integrates these inputs to form a comprehensive understanding of the network's current state. 2. User-Configured Rules: End users and organizational teams (104) can configure specific rules that guide the engine's decision-making process. These rules can include transaction priorities, cost constraints, latency thresholds, and specific routing preferences. By incorporating these custom rules, the engine tailors its operations to align with the specific needs and objectives of the business. 3. Real-Time Data Analytics: The engine employs real-time data analytics to process the information collected from the network. This includes analyzing connection types, cost calculations, points of failure, route efficiency, routing table configurations, system latency, system resources, and transaction priorities. By continuously monitoring and analyzing these metrics, the engine can make informed decisions about the optimal routing paths for data.

Detailed components and processes of the engine include: 1. Connection Types and Metrics Analysis: The engine evaluates different connection types (e.g., wired, wireless, VPN) and their associated metrics to determine the most suitable paths for data transmission. It considers factors like bandwidth availability, latency, and reliability to choose the best possible routes. 2. Cost Calculation: Cost efficiency is a critical consideration for the engine. It performs detailed cost calculations to determine the most economical routes for data transfer. By analyzing cost metrics and comparing different routing options, the engine ensures that the network operates within budgetary constraints while maintaining high performance. 3. Points of Failure and Route Efficiency: The engine identifies potential points of failure within the network and evaluates route efficiency. By understanding where failures are likely to occur and how efficient different routes are, the engine can avoid unreliable paths and prioritize routes that offer the best performance. 4. Routing Table Configuration: The engine continuously updates and configures routing tables based on real-time data. These tables are critical for directing data traffic along the most efficient paths. The configuration process involves evaluating current network conditions and making adjustments to optimize data flow. 5. System Latency and Resource Utilization: System latency and resource utilization are key performance metrics that the engine monitors. By analyzing these metrics, the engine can identify bottlenecks and areas where performance can be improved. It ensures that data is routed in a manner that minimizes latency and makes optimal use of available resources. 6. Transaction Priorities: The engine prioritizes transactions based on user-defined rules. Critical transactions that require immediate processing are given higher priority, ensuring that they are handled promptly. This prioritization helps maintain the efficiency and reliability of the network, particularly during peak usage periods.

Advanced features of the engine include the following. 1. Predictive Analytics: The engine incorporates predictive analytics to anticipate future network conditions. By analyzing historical data and identifying patterns, the engine can forecast potential network congestion and other issues. This predictive capability allows the engine to proactively adjust routing paths to prevent performance degradation. 2. Machine Learning and AI: The engine leverages machine learning and artificial intelligence (AI) to enhance its decision-making process. These technologies enable the engine to learn from past network conditions and improve its routing algorithms over time. AI-driven analytics help the engine to make more accurate predictions and optimize routing paths more effectively. 3. Multi-Cloud and Hybrid Cloud Management: The engine supports multi-cloud and hybrid cloud environments, dynamically selecting the most appropriate cloud providers or on-premises resources based on real-time conditions and configured rules. This flexibility ensures that data is always processed in the most suitable environment, enhancing operational efficiency. 4. Compliance and Security: The engine incorporates compliance and security considerations into its routing decisions. It ensures that data transfer and processing activities adhere to regulatory requirements and organizational security policies. The engine can automatically route data through compliant paths and enforce necessary security protocols to protect data integrity. 5. Scalability: The engine is designed to handle varying workloads and network demands. It can dynamically scale its operations by updating routing tables and security groups based on real-time changes in network conditions. This scalability ensures that the network can grow and adapt without compromising performance or security.

The engine also provides for integration and monitoring. 1. Integration with Network Monitoring Tools: The engine integrates seamlessly with network monitoring tools (128) that provide continuous oversight of network performance. These tools monitor key metrics such as latency, bandwidth usage, and system resource utilization. By integrating with these tools, the engine ensures it has access to the most current and accurate performance data. 2. Continuous Optimization: The engine operates in a continuous cycle of monitoring, analysis, and adjustment. It continuously evaluates network performance, identifies areas for improvement, and makes real-time adjustments to routing paths. This ongoing optimization process ensures that the network remains efficient, responsive, and reliable.

Additional benefits of the engine include the following. 1. Enhanced User Experience: By optimizing network routing and data processing, the engine significantly enhances the user experience. Users benefit from faster transaction processing, reduced latency, and more reliable network performance. This leads to increased satisfaction and productivity. 2. Cost Savings: The engine's ability to optimize routing paths and reduce operational costs provides significant financial benefits. By selecting the most economical routes and making efficient use of resources, the engine helps organizations minimize expenses while maintaining high levels of performance. 3. Reliability and Compliance: The engine ensures that the network operates reliably and complies with all relevant regulations. Its advanced monitoring, predictive analytics, and compliance features protect against potential disruptions and ensure that data is handled securely and in accordance with legal requirements.

Referring more generally to the other elements of FIG. 1, the system begins with its users (102), who can be either individual end users or members of an organizational team. These users interact with the system by providing crucial inputs such as authorization data and transaction retrieval information. This interaction ensures that only verified users can access specific functionalities, thereby maintaining the security and integrity of the network. Both end users and organizational teams (104) have the capability to configure rules that direct the dynamic route optimization engine. These rules are essential as they define how the system should handle various types of transactions and data flows. For instance, users can set priorities for different transaction types, establish cost constraints for data transfers, and define acceptable latency thresholds. These customized rules enable the system to tailor its operations to meet specific business needs and objectives, ensuring efficient and effective network management.

Central to the system's functionality is a comprehensive datastore (106) that contains a wide array of variables, data, and metrics necessary for the engine's operation. This datastore includes information on connection types, cost calculations, points of failure, route efficiency metrics, routing table configurations, system latency measurements, system resource utilization, transaction priorities, and user-defined rules. Each of these elements plays a critical role in determining the most efficient routing paths for data within the network. For example, by analyzing connection types and route efficiency metrics, the engine can select the fastest and most reliable routes, while cost calculations and transaction priorities ensure that critical data is processed promptly and economically.

The data is stored across a variety of storage solutions, including local datastores (108), cloud datastores (110), and traditional databases (112). Local datastores provide rapid access to frequently used data, ensuring quick response times. Cloud datastores offer scalability, allowing the system to handle large volumes of data without performance degradation. Traditional databases ensure robust data management and retrieval capabilities, maintaining data integrity and reliability.

Supporting this architecture is a network of multi-cloud, hybrid cloud, and local data centers (114). These data centers host a range of applications and systems critical to the dynamic route optimization engine's operation. Key components within these data centers include intermediate systems for data lookups, which facilitate quick access to necessary information; integration brokers and workflow systems, which manage the flow of data between different applications and services; and transaction processing and posting systems, which handle the execution and recording of transactions. These components ensure that data is processed and routed efficiently, regardless of its origin or destination.

Within this infrastructure, application entities (116) manage user authorizations, ensuring that only authorized users can access specific data and functionalities. This is crucial for maintaining network security and integrity. Additionally, data analytics components (118) analyze incoming data to provide insights that aid in the optimization process. This analysis helps the engine make informed decisions regarding routing paths and resource allocation.

The Data Analytics component (118) within the system architecture is responsible for examining and interpreting the vast amounts of data flowing through the network. This component plays a critical role in providing insights essential for the optimization process. Data analytics collects data from multiple sources within the network, including performance metrics, user activities, transaction records, and system logs. Once collected, the data is processed to remove redundancies or inconsistencies, ensuring that the data set is clean and reliable for further analysis. Descriptive analytics summarize and describe the main features of the data, calculating averages, identifying trends, and detecting patterns that provide a snapshot of the network's current state. Diagnostic analytics delve deeper to understand the underlying causes of observed patterns and anomalies, identifying why certain issues are occurring and what factors contribute to them. The insights derived from data analysis are often visualized using charts, graphs, and dashboards, making it easier for network administrators and decision-makers to understand complex data sets and derive actionable insights.

The Data Analysis component (120) takes the insights derived from data analytics further by performing more in-depth examinations and evaluations of the data. This component focuses on understanding the implications of the data and using it to make informed decisions about network management and optimization. Data analysis involves a detailed examination of the data, looking at it from multiple angles to uncover deeper insights that can inform strategic decisions. It identifies and analyzes trends over time, understanding how network performance metrics change, and uses this knowledge to predict future conditions and adjust operations accordingly. This component also examines relationships between different data points to understand correlations and causations, identifying which factors influence network performance and how they interact. Using historical data, the analysis component builds predictive models that forecast future network conditions, enabling the system to anticipate potential issues and take proactive measures. The insights gained from data analysis are used to develop optimization strategies, recommending specific actions to improve network performance, such as rerouting data, adjusting resource allocation, or changing operational policies.

The Predictive Data Analytics component (122) is a specialized area of data analytics focused on forecasting future network conditions and potential issues before they occur. This component uses advanced techniques such as machine learning and statistical modeling to predict future events based on historical data and current trends. Predictive data analytics begins with a thorough analysis of historical data to identify patterns and trends that have occurred over time, providing a historical perspective crucial for building accurate predictive models. It employs statistical models to analyze the probability of future events, considering various factors that influence network performance, such as traffic patterns, resource utilization, and external conditions. Advanced machine learning algorithms enhance the predictive capabilities of the system, learning from past data, improving over time, and making more accurate predictions by recognizing complex patterns that may not be evident through traditional statistical methods. Predictive data analytics generates forecasts about future network conditions, including predictions about network congestion, potential points of failure, resource needs, and expected performance levels. By predicting future conditions, the system can take proactive measures to optimize network performance. For instance, if predictive analytics indicate potential congestion, the system can preemptively reroute data to less congested paths, allocate additional resources, or adjust operational parameters to mitigate the impact. Additionally, if it is predicted that a higher priority transaction will occur in the near future, the Predictive Data Analytics component can relay this information to the engine. The engine could then select a currently suboptimal route for an immediate task to reserve resources for the optimal route needed for the high-priority task that is expected shortly. This predictive capability also helps in identifying potential risks and vulnerabilities within the network, allowing the system to implement risk management strategies to enhance network resilience and reliability.

All three components-Data Analytics (118), Data Analysis (120), and Predictive Data Analytics (122)—are deeply integrated with the Dynamic Route Optimization Engine (100). The insights and forecasts generated by these components provide the engine with the necessary information to make informed and effective routing decisions. By leveraging detailed data insights, the optimization engine can make more informed decisions about routing paths, resource allocation, and operational adjustments. Predictive analytics enable the system to anticipate and address issues before they impact performance, ensuring smoother and more reliable network operations. The feedback loop created by continuous data analysis and prediction allows the system to learn and improve over time, enhancing its ability to manage complex and dynamic network environments.

Data Analytics (118), Data Analysis (120), and Predictive Data Analytics (122) each play a distinct role in collecting, processing, and interpreting data to provide actionable insights and forecasts. These insights enable the Dynamic Route Optimization Engine to optimize network performance proactively and effectively, ensuring efficient, secure, and reliable data management.

The system's computing resources (124) are designed to be diverse and robust to handle the extensive demands of network optimization and data processing. These resources integrate a variety of technological infrastructures, ensuring the system's flexibility and capability to manage different types of workloads efficiently and effectively.

At the core of these resources are local and distributed systems. Local systems provide immediate and direct access to computational power, ensuring low latency and high-speed processing for tasks that require quick turnaround times. Distributed systems, on the other hand, offer scalability and redundancy. By distributing the workload across multiple nodes, these systems can handle larger volumes of data and provide fault tolerance, ensuring that the system remains operational even if some nodes fail.

Classical computing resources form the backbone of the system, encompassing traditional processors and servers that perform general-purpose computations. These resources are reliable and have been optimized over decades to provide consistent performance. They are essential for running standard applications and performing routine data processing tasks.

Advanced AI/ML (artificial intelligence/machine learning) capabilities significantly enhance the system's functionality. These capabilities include sophisticated algorithms that can learn from historical data, identify patterns, and make predictions. For instance, machine learning models can be used to forecast network congestion and suggest preemptive actions to avoid it. Artificial intelligence can automate decision-making processes, reducing the need for human intervention and allowing the system to respond more quickly to changing conditions.

Hybrid computing resources combine the strengths of classical computing and AI/ML. They are particularly useful for complex tasks that require both general-purpose computing and specialized AI-driven analysis. For example, hybrid systems can process large datasets using classical computing resources and then apply machine learning algorithms to derive insights from that data.

Cloud computing services are a vital part of the system's computing resources. These services provide scalable and flexible computing power that can be adjusted based on current needs. Cloud services can be expanded or reduced quickly, allowing the system to handle peak loads without overprovisioning resources. This scalability is crucial for maintaining performance during periods of high demand.

Dedicated servers within the system offer high-performance processing capabilities for tasks that require consistent and reliable computational power. These servers are optimized for specific applications, ensuring that critical tasks are executed efficiently. They provide a stable and controlled environment for processing sensitive data and running essential applications.

Quantum computing technologies represent the cutting-edge of the system's capabilities. Quantum computers can perform calculations at speeds that are orders of magnitude faster than classical computers. This technology is particularly useful for solving complex optimization problems and performing high-dimensional data analysis. Quantum computing enables the system to tackle problems that would be infeasible with classical computing alone, such as simulating complex network behaviors or optimizing large-scale logistical operations.

These diverse computing resources work together to provide the necessary power to process large volumes of data rapidly and accurately. The integration of local and distributed systems ensures that the system can handle both immediate and large-scale computational tasks. The use of classical computing resources guarantees reliability and consistency, while AI/ML capabilities add a layer of intelligence and adaptability. Hybrid systems offer a balanced approach to complex tasks, and cloud computing services ensure scalability and flexibility. Quantum computing pushes the boundaries of what is possible, allowing the system to solve previously intractable problems.

By combining these varied resources, the system is well-equipped to respond to real-time network conditions efficiently. It can dynamically allocate resources based on current demands, ensuring optimal performance and reliability. The integration of advanced technologies like AI/ML and quantum computing enhances the system's ability to adapt to changing conditions and continuously improve its operations. This comprehensive approach to computing resources makes the system a powerful tool for managing modern network environments, capable of maintaining high performance, security, and cost-effectiveness.

Enterprise systems and applications (126) are seamlessly integrated into this architecture, offering specialized functionalities that enhance the system's capabilities. Examples of these applications include a cost calculator (App-A), which determines the most economical routes for data transfer; a transaction priority determiner (App-B), which ensures that critical transactions are processed first; a transaction/data retrieval and user authorization paths manager (App-C), which handles the retrieval of transaction data and user authorizations; and connections to various applications (App-D), which facilitate seamless data flow and integration. These applications provide targeted solutions that address specific aspects of network management, contributing to the overall efficiency and effectiveness of the system.

Network monitoring tools (128) are integrated into the system to provide continuous oversight of network performance. These tools monitor key metrics such as latency, bandwidth usage, and system resource utilization. By continuously tracking these metrics, the monitoring tools can detect potential issues before they impact performance, allowing the dynamic route optimization engine to make timely adjustments. The integration of these tools ensures that the system remains responsive and efficient, maintaining high levels of performance and reliability.

In summary, FIG. 1 presents a highly detailed and interconnected system designed to optimize network routing and data processing through a dynamic route optimization engine. By leveraging real-time data, user-configured rules, advanced computing resources, and comprehensive monitoring tools, the system can adapt to changing network conditions and ensure efficient, secure, and cost-effective data management. This architecture not only improves network performance and reliability but also enhances user experience and compliance with regulatory requirements, providing a robust solution for modern network environments.

Figure 2:
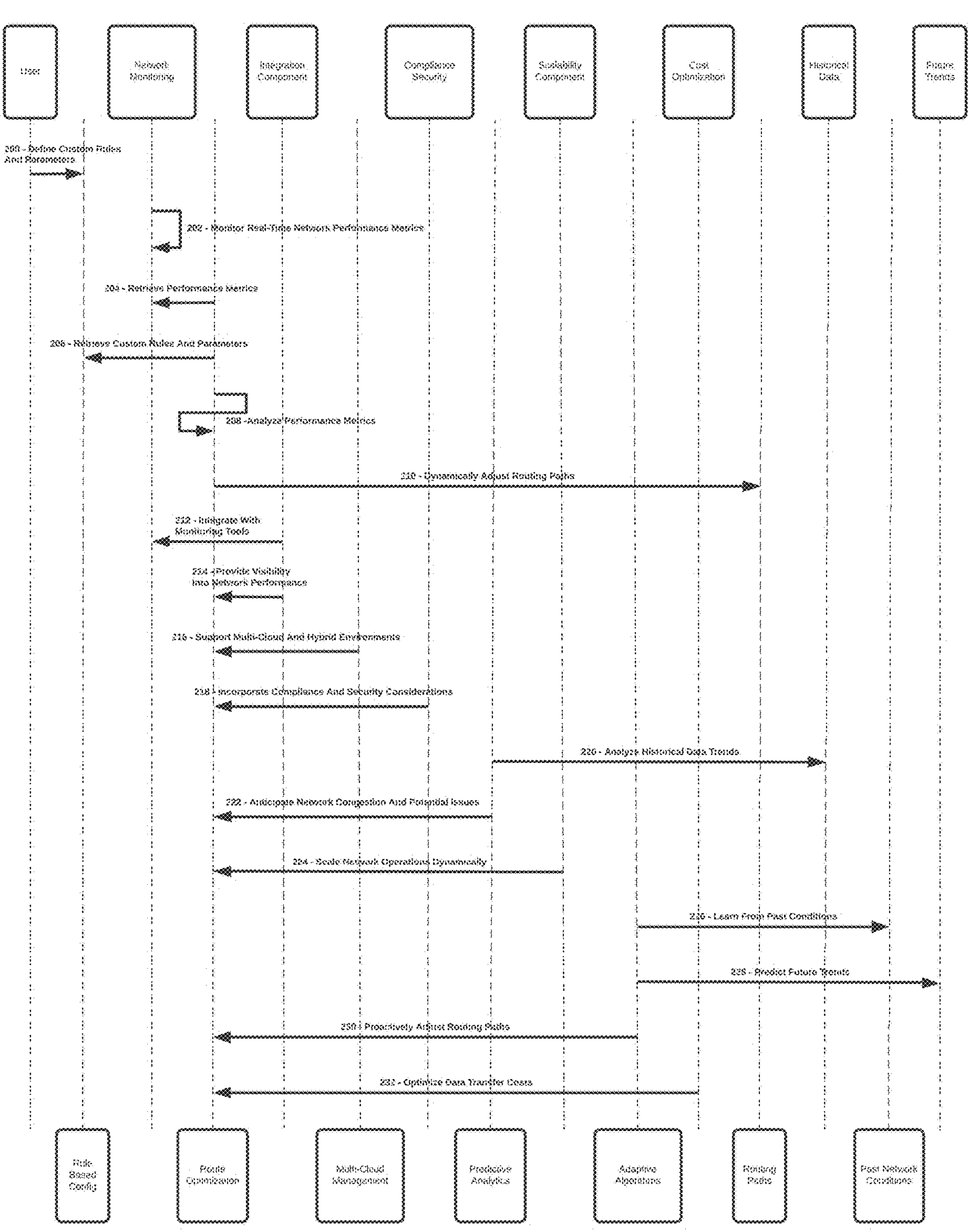
FIG. 2 is a sequence diagram that illustrates sample operations for optimizing network routing and data processing, starting with defining custom rules and parameters, monitoring real-time network performance, and dynamically adjusting routing paths based on analyzed data. The diagram highlights the integration of various components including compliance, security, scalability, and predictive analytics to ensure efficient and adaptive network management.

FIG. 2, by way of non-limiting disclosure, depicts a sequence diagram with a detailed overview of the process involved in optimizing network routing and data processing through dynamic route optimization. The diagram illustrates the interaction between various system components, highlighting each step necessary to achieve efficient and adaptive network management.

The process begins with the User defining custom rules and parameters through the Rule-Based Configuration Component. In step 200, the user sets up rules and parameters that govern transaction processing, data retrieval, and user authorization. This includes specifying cost calculations, transaction priorities, application inventories, and routing table configurations. These custom rules and parameters are relevant for tailoring the system's behavior to meet specific business needs and objectives.

Once the custom rules and parameters are defined, the Network Monitoring Tool starts monitoring real-time network performance metrics in step 202. This involves continuously collecting data on various network performance indicators such as latency, bandwidth availability, memory utilization, CPU load, and throughput capacity. These metrics provide a comprehensive view of the current state of the network, which is essential for making informed routing decisions.

In step 204, the Integration Component retrieves the performance metrics collected by the network monitoring tools. This data is then used to provide continuous visibility into network performance, ensuring that the system can respond promptly to any changes in network conditions.

Step 206 involves retrieving the custom rules and parameters that were previously defined by the user. These rules and parameters are fed into the Dynamic Route Optimization Engine, which is responsible for analyzing the real-time performance metrics and making routing decisions.

In step 208, the Dynamic Route Optimization Engine analyzes the real-time network performance metrics to determine the most efficient routing paths for data transfer and processing. This analysis involves comparing the current network conditions with the predefined rules and parameters to identify optimal routes that minimize latency and maximize throughput.

Following the analysis, the Dynamic Route Optimization Engine dynamically adjusts the routing paths in step 210. This involves modifying the routes based on the analyzed data and the configured custom rules and parameters, ensuring that the network can adapt to real-time changes in conditions and demands.

Step 212 involves integrating the Integration Component with the network monitoring tools to provide continuous visibility into network performance metrics. This integration is essential for maintaining an up-to-date view of the network's status and for informing routing decisions.

In step 214, the system provides visibility into network performance through the integrated monitoring tools. This continuous feedback loop helps in maintaining an accurate and real-time understanding of the network's performance, allowing for proactive management and optimization.

Step 216 involves supporting multi-cloud and hybrid environments through the Multi-Cloud and Hybrid Cloud Management Component. This component dynamically selects the most appropriate cloud provider or on-premises resource based on the configured custom rules and real-time network conditions. By managing data transfer and processing across diverse infrastructure platforms, this component enhances the flexibility and efficiency of network operations.

The Compliance and Security Component plays a critical role in step 218 by incorporating compliance and security considerations into routing decisions. This component ensures that data routing adheres to regulatory requirements and security protocols. It automatically routes data through compliant paths and enforces necessary security measures, reducing the risk of non-compliance and enhancing data security.

In step 220, the Predictive Analytics Component utilizes predictive analytics to analyze historical data, identify trends, and anticipate network congestion and potential issues before they occur. This proactive analysis allows the system to make preemptive adjustments to routing paths, ensuring optimal network performance even during periods of high demand or unexpected events.

Step 222 involves anticipating network congestion and potential issues based on the analysis performed by the Predictive Analytics Component. By identifying patterns and trends in historical data, the system can forecast potential problems and adjust routing paths in advance to prevent performance degradation.

The Scalability Component dynamically scales network operations in step 224 to handle varying workloads and demands. This involves automatically updating routing tables and security groups based on changing network conditions. By scaling operations efficiently, the system can accommodate growth and fluctuations in network traffic without compromising performance.

In step 226, the system continuously learns from past network conditions through the Adaptive Algorithms. These algorithms analyze historical data to understand previous network behaviors and predict future trends. This continuous learning enables the system to make proactive adjustments to routing paths, enhancing the resilience and reliability of network operations.

Step 228 involves predicting future trends based on the learned data from the Adaptive Algorithms. By anticipating future network conditions, the system can proactively adjust routing paths to maintain optimal performance.

In step 230, the system proactively adjusts routing paths to optimize data transfer and processing. This involves making real-time changes to the routing configuration to ensure that the network adapts to current conditions and demands, maintaining high levels of efficiency and performance.

The Cost Optimization Component plays a role in step 232 by optimizing data transfer costs. This component makes intelligent routing decisions based on real-time data and the configured custom rules, ensuring cost-effective network operations without compromising performance. By selecting the most economical routes, the system helps reduce operational expenses.

Finally, the system focuses on enhancing user experience by improving network performance, reducing latency, and ensuring efficient data retrieval and transaction processing. This is achieved through the User Experience Component, which continuously monitors and adjusts the network to provide a superior user experience, leading to increased satisfaction and loyalty.

Overall, the sequence diagram provides a detailed and interconnected process that leverages real-time data, predictive analytics, adaptive algorithms, and rule-based configurations to achieve dynamic route optimization and efficient data processing. Each component plays a role in ensuring that the network operates at peak efficiency, adapting to changing conditions and demands while maintaining compliance and security.

Figure 3:
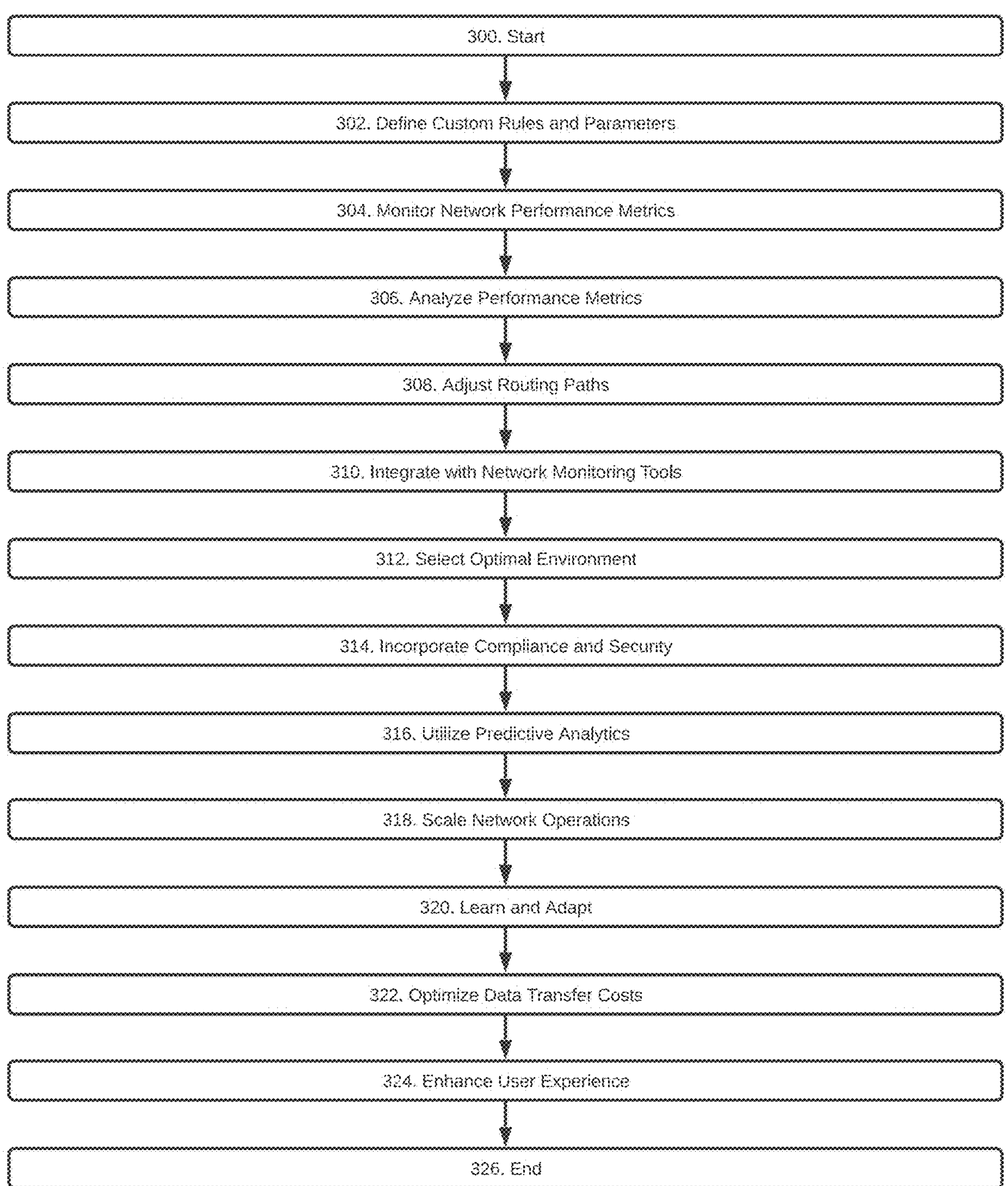
FIG. 3 illustrates a flow diagram detailing the steps involved in optimizing network routing and data processing, starting from defining custom rules and parameters, monitoring and analyzing network performance metrics, to dynamically adjusting routing paths and ensuring compliance and security. The diagram emphasizes continuous learning, predictive analytics, scalability, cost optimization, and enhancing user experience to maintain an efficient and adaptive network operation.

FIG. 3, by way of non-limiting disclosure, depicts a comprehensive flow diagram that details the process involved in optimizing network routing and data processing through a series of methodical steps. Each step in this process is relevant for ensuring that the network operates efficiently, adapts to real-time conditions, and maintains high performance and security standards.

The process begins at step 300, where the system initiates the optimization procedure. This initial step sets the stage for the entire process, ensuring that all necessary components are ready to perform their respective functions.

In step 302, custom rules and parameters are defined by the Rule-Based Configuration Component. This step involves setting up guidelines for transaction processing, data retrieval, and user authorization. The rules can include cost calculations, transaction priorities, application inventories, and routing table configurations. These custom rules are essential as they tailor the system's operations to meet specific business needs and objectives, allowing for a more personalized and efficient network management.

Next, in step 304, the Network Monitoring Tools start monitoring network performance metrics. These tools collect real-time data on various aspects of the network, including latency, bandwidth availability, memory utilization, CPU load, and throughput capacity. This continuous monitoring is vital for maintaining an up-to-date view of the network's status and identifying any potential issues that may arise.

In step 306, the Dynamic Route Optimization Engine analyzes the monitored performance metrics. This analysis is critical for identifying the most efficient routing paths for data transfer and processing. By evaluating the current network conditions against the predefined rules and parameters, the system can determine optimal routes that minimize latency and maximize throughput.

Following this analysis, step 308 involves dynamically adjusting the routing paths based on the analyzed data and the predefined rules and parameters. The Dynamic Route Optimization Engine modifies the routes to ensure that the network can adapt to real-time changes in conditions and demands, avoiding congestion and enhancing overall efficiency.

The system then integrates with network monitoring tools in step 310 through the Integration Component. This integration ensures continuous visibility into network performance metrics and provides real-time data to inform routing decisions. By maintaining an up-to-date view of the network, the system can promptly respond to any changes and make necessary adjustments.

Step 312 focuses on selecting the optimal environment for data processing. Managed by the Multi-Cloud and Hybrid Cloud Management Component, this step involves dynamically choosing the best cloud provider or on-premises resource based on real-time conditions and configured rules. This capability enhances operational flexibility and efficiency by ensuring that data is always processed in the most suitable environment.

In step 314, compliance and security considerations are incorporated into routing decisions by the Compliance and Security Component. This component ensures that all data transfer and processing activities adhere to regulatory requirements and organizational security policies. It automatically routes data through compliant paths and enforces necessary security protocols, reducing the risk of non-compliance and enhancing data security.

Predictive analytics are utilized in step 316 by the Predictive Analytics Component to analyze historical data, identify trends, and anticipate potential network congestion or issues before they occur. By leveraging past data and identifying patterns, the system can forecast future network conditions and make proactive adjustments to routing paths, preventing performance degradation.

In step 318, the Scalability Component dynamically scales network operations to handle varying workloads and network demands. This step involves automatically updating routing tables and security groups based on changing network conditions, ensuring that the system can scale efficiently as network traffic fluctuates. By adapting to these changes, the system can maintain high performance and avoid bottlenecks.

The adaptive algorithms come into play in step 320 through the Adaptive Algorithms Component. These algorithms continuously learn from past network conditions and predict future trends. By analyzing historical data and understanding previous network behaviors, the system can make proactive adjustments to routing paths, enhancing the resilience and reliability of network operations.

In step 322, the Cost Optimization Component optimizes data transfer costs. This component makes intelligent routing decisions based on real-time data and configured rules, ensuring economical operation without sacrificing performance. By selecting the most cost-effective routes, the system helps reduce operational expenses while maintaining high levels of network efficiency.

Finally, step 324 focuses on enhancing the user experience through the User Experience Component. This step involves improving network performance, reducing latency, and ensuring efficient data retrieval and transaction processing. By continuously monitoring and adjusting the network, the system can provide a superior user experience, leading to increased satisfaction and loyalty.

The process concludes at step 326, where the optimization procedure ends. At this stage, the system has dynamically optimized the network routing and data processing, ensuring efficient, secure, and high-performance operations. The comprehensive approach outlined in FIG. 3 highlights the importance of each component and their interactions in achieving a robust and adaptable network management solution.

Figure 4:
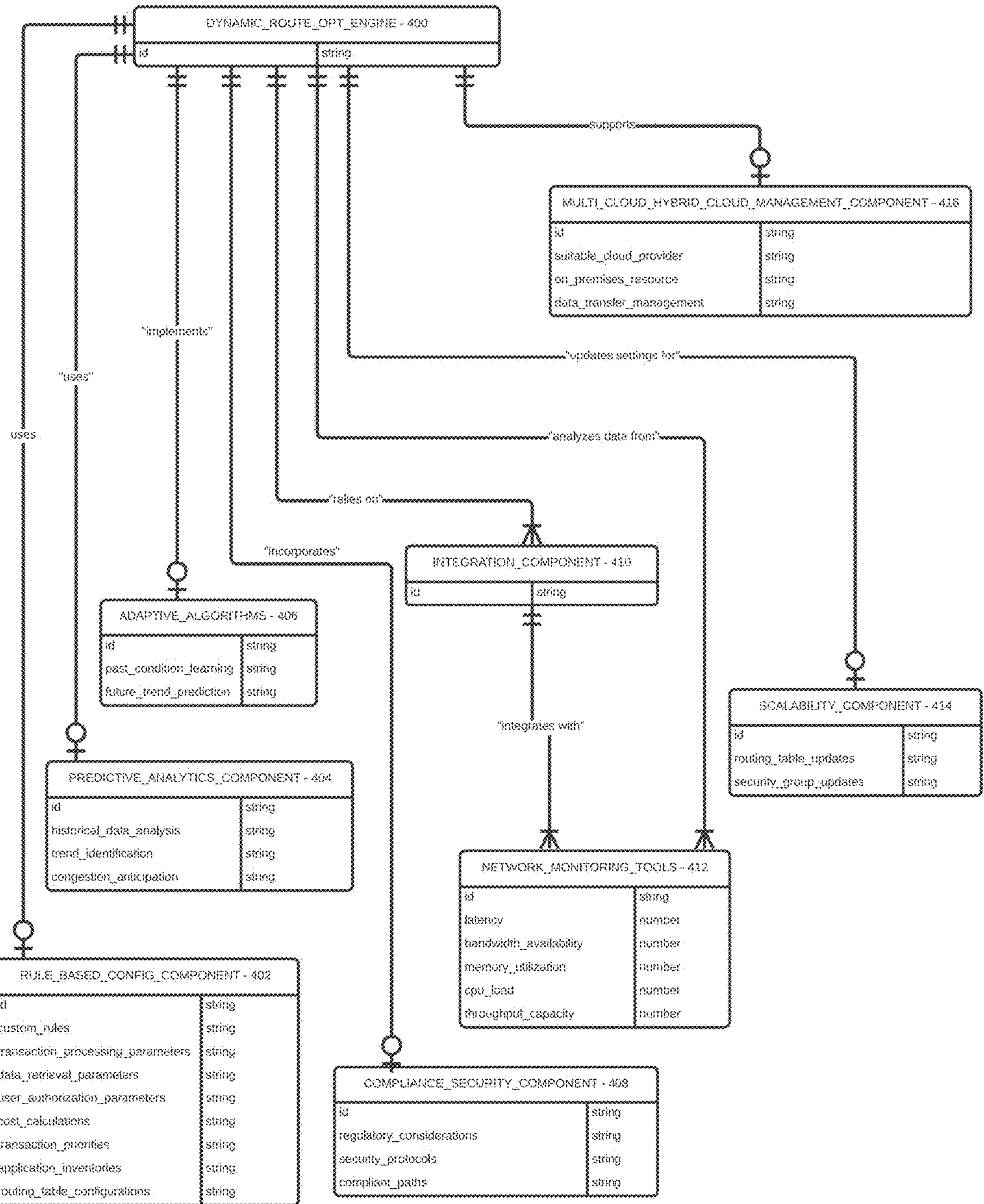
FIG. 4 presents an entity relationship diagram that outlines the various components involved in the network optimization system, including the dynamic route optimization engine, rule-based configuration component, network monitoring tools, and integration component. It also highlights components such as multi-cloud management, compliance and security, predictive analytics, scalability, adaptive algorithms, and cost optimization, illustrating their interconnections and roles in achieving efficient network management.

FIG. 4, by way of non-limiting disclosure, depicts a comprehensive system architecture designed to optimize network routing and data processing through a dynamic and adaptive approach. This architecture comprises several interconnected components, each playing a specific role in enhancing network efficiency, security, and adaptability. The detailed interactions and functions of these components ensure that the network operates optimally, responds to real-time conditions, and maintains high performance standards.

At the core of the system is the Dynamic Route Optimization Engine, labeled as component 400. This engine serves as the primary decision-making unit, tasked with analyzing real-time network performance metrics and adjusting routing paths dynamically to optimize data transfer and processing. The engine utilizes advanced algorithms to process inputs from various components and make informed decisions that improve network efficiency and performance. By continuously evaluating network conditions, the Dynamic Route Optimization Engine ensures that the most efficient routes are selected, minimizing latency and maximizing throughput.

The Rule-Based Configuration Component, identified as component 402, allows users to define custom rules and parameters that govern the network's operations. This component is critical for tailoring the system's behavior to meet specific business needs and objectives. Users can specify various guidelines, including cost calculations, transaction priorities, application inventories, and routing table configurations. By setting these rules, the component ensures that transaction processing, data retrieval, and user authorization are conducted according to the predefined criteria, providing a customized and efficient network management experience.

Component 412 represents the Network Monitoring Tools, which play a role in collecting real-time performance data from the network. These tools continuously monitor critical metrics such as latency, bandwidth availability, memory utilization, CPU load, and throughput capacity. The data gathered by these tools is essential for the Dynamic Route Optimization Engine to analyze and make data-driven decisions. Continuous monitoring helps maintain an up-to-date view of the network's status, enabling the system to identify and address potential issues promptly.

The Integration Component, labeled as component 410, ensures seamless communication and data exchange between the Dynamic Route Optimization Engine and the Network Monitoring Tools. This component integrates various system parts, ensuring smooth data flow and coordination. By maintaining continuous visibility into network performance metrics, the Integration Component facilitates real-time decision-making, ensuring that the optimization engine receives the most current and accurate performance data.

The Multi-Cloud and Hybrid Cloud Management Component, identified as component 416, is responsible for managing data transfer and processing across multiple cloud environments. This component dynamically selects the most suitable cloud provider or on-premises resource based on real-time network conditions and configured rules. By efficiently distributing workloads across different environments, the Multi-Cloud and Hybrid Cloud Management Component enhances operational flexibility and ensures that data is processed in the most optimal location, thereby improving overall network efficiency.

The Compliance and Security Component, labeled as component 408, ensures that all data transfer and processing activities adhere to regulatory requirements and organizational security policies. This component automatically routes data through compliant paths and enforces necessary security measures. By incorporating regulatory and security considerations into routing decisions, the Compliance and Security Component reduces the risk of non-compliance and enhances data security, maintaining the integrity and confidentiality of data as it moves through the network.

Component 404, the Predictive Analytics Component, utilizes historical data to analyze trends and anticipate network congestion and other potential issues before they occur. By examining past network performance data and identifying patterns, this component enables the system to forecast future network conditions and make proactive adjustments to routing paths. This foresight helps prevent congestion and ensures that the network operates smoothly, even during peak demand periods or unexpected events.

The Scalability Component, identified as component 414, is designed to dynamically scale network operations to handle varying workloads and network demands. This component automatically updates routing tables and security groups based on real-time changes in network conditions. By efficiently scaling operations, the system can accommodate growth and fluctuations in network traffic without compromising performance or security. The Scalability Component ensures that the network remains robust and responsive to changing demands, providing a scalable solution for growing enterprises.

Component 406 represents the Adaptive Algorithms, which continuously learn from past network conditions and predict future trends. These algorithms analyze historical data to understand previous network behaviors and forecast future conditions. This continuous learning capability enables the system to make proactive adjustments to routing paths, enhancing the resilience and reliability of network operations. By adapting to evolving network patterns, the Adaptive Algorithms ensure that the system remains effective in optimizing network performance over time.

The Cost Optimization Component, labeled as component 418, focuses on reducing operational expenses by optimizing data transfer costs. This component makes intelligent routing decisions based on real-time data and the configured rules, ensuring that the most cost-effective routes are selected. By balancing cost and performance, the Cost Optimization Component helps enterprises achieve efficient and economical network operations. This component is vital for managing the financial aspects of network operations, ensuring that cost savings are realized without sacrificing performance.

Finally, the User Experience Component, identified as component 420, aims to enhance the overall user experience by improving network performance, reducing latency, and ensuring efficient data retrieval and transaction processing. This component continuously monitors the network and adjusts operations to provide a superior service experience. Enhanced user satisfaction and loyalty are achieved through faster and more reliable network performance, making this component relevant for customer-facing applications and services.

The Network Optimization System, component 500, integrates all these components, coordinating their activities to ensure cohesive and efficient network management. This system leverages the capabilities of each component to dynamically optimize network routing and data processing, ensuring that the network operates at peak efficiency, adapts to real-time conditions, and maintains compliance with regulatory requirements. By integrating components such as the Dynamic Route Optimization Engine, Rule-Based Configuration Component, Network Monitoring Tools, Integration Component, Multi-Cloud and Hybrid Cloud Management Component, Compliance and Security Component, Predictive Analytics Component, Scalability Component, Adaptive Algorithms, Cost Optimization Component, and User Experience Component, the system provides a robust solution for modern network management.

In summary, FIG. 4 illustrates a robust and comprehensive system architecture where each component plays a critical role in achieving efficient, secure, and adaptive network operations. The integration and interaction between these components ensure that the network can respond dynamically to changing conditions, optimize performance, and maintain high standards of security and compliance. The detailed description of each component highlights the importance of real-time data, predictive analytics, adaptive algorithms, and rule-based configurations in maintaining an efficient, secure, and high-performance network, providing a comprehensive solution for modern network management.

Figure 5:
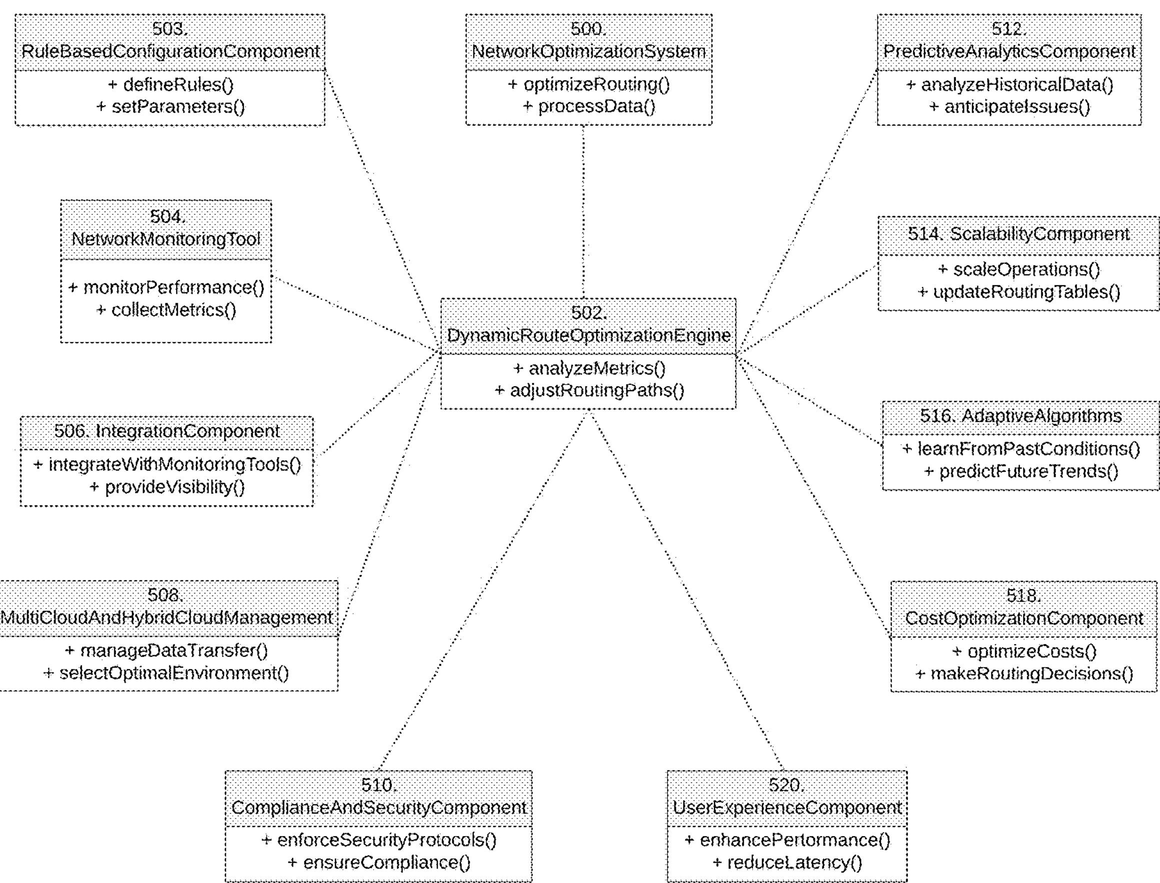
FIG. 5 illustrates a sample class diagram for the network optimization system, depicting the main classes and their methods. The diagram highlights the key components such as the Dynamic Route Optimization Engine, Rule-Based Configuration Component, Network Monitoring Tool, and their interactions within the system to optimize network performance and processing.

FIG. 5 presents an in-depth class diagram illustrating the architecture of the network optimization system. Each class is meticulously designed to perform specific functions that contribute to the overall optimization of network routing and data processing. Below is a detailed explanation of each class, including their attributes and methods, and how they interact within the system to ensure efficient, secure, and adaptive network operations.

The Network Optimization System (500) is the central coordinating class that integrates all other components within the architecture. It is responsible for managing the overall process of network optimization. The optimizeRouting( ) method oversees the optimization of routing paths, ensuring that data packets take the most efficient routes through the network. The processData( ) method handles the processing of data within the network, ensuring that data is managed and routed according to the defined parameters and real-time conditions.

At the core of the system is the Dynamic Route Optimization Engine (502). This engine is relevant for analyzing real-time network performance metrics and dynamically adjusting routing paths to optimize data transfer and processing. It includes methods such as analyzeMetrics( ), which processes performance data collected from various monitoring tools to identify the most efficient routing paths. The adjustRoutingPaths( ) method implements the changes needed to optimize the flow of data through the network. This engine ensures that the network adapts to real-time conditions, minimizing latency and maximizing throughput.

The Rule-Based Configuration Component (503) allows users to customize the behavior of the network by defining specific rules and parameters. This component includes attributes such as custom_rules, which store the user-defined guidelines, and transaction_processing_parameters, which dictate how transactions should be handled. The defineRules ( ) method enables users to set up these custom rules, while the setParameters( ) method allows for the configuration of various operational parameters. This component ensures that the network operates according to the specific needs and preferences of the users.

The Network Monitoring Tools (504) continuously collect and monitor real-time performance data from the network. Key attributes include latency, bandwidth_availability, memory_utilization, cpu_load, and throughput_capacity, which represent the critical metrics monitored. Methods such as monitorPerformance( ) track these metrics in real-time, while collectMetrics( ) gathers the data needed for analysis. These tools provide the necessary information for the Dynamic Route Optimization Engine to make informed decisions about routing paths.

The Integration Component (506) plays a vital role in ensuring seamless communication and data exchange between the Dynamic Route Optimization Engine and the Network Monitoring Tools. It includes methods like integrateWithMonitoringTools( ), which ensures that the performance data is effectively integrated into the optimization process, and provideVisibility( ) which maintains continuous visibility into network performance metrics. This component ensures that the optimization engine receives accurate and current data, facilitating real-time decision-making.

The Multi-Cloud and Hybrid Cloud Management Component (508) manages data transfer and processing across diverse cloud environments. Attributes such as suitable_cloud_provider and on_premises_resource indicate the chosen environments for data processing. Methods like manageDataTransfer( ) handle the transfer of data across different cloud providers, and selectOptimalEnvironment( ) dynamically chooses the best cloud provider or on-premises resource based on real-time conditions and configured rules. This component enhances operational flexibility and ensures that data processing occurs in the most optimal location, improving overall network efficiency.

The Compliance and Security Component (510) ensures that all data transfer and processing activities adhere to regulatory requirements and organizational security policies. Attributes such as regulatory_considerations and security_protocols outline the necessary compliance and security measures. Methods like enforceSecurityProtocols( ) apply the required security protocols, while ensureCompliance( ) ensures that data is routed through compliant paths. This component reduces the risk of non-compliance and enhances data security, maintaining the integrity and confidentiality of data as it moves through the network.

The Predictive Analytics Component (512) leverages historical data to analyze trends and anticipate potential issues before they occur. Attributes include historical_data_analysis, which stores data analysis results, and trend_identification, which identifies patterns in the data. Methods like analyzeHistoricalData( ) examine past network performance to identify trends, and anticipateIssues( ) forecasts future network conditions. This component enables the system to make proactive adjustments to routing paths, preventing congestion and ensuring smooth network operations even during peak demand periods.

The Scalability Component (514) dynamically scales network operations to handle varying workloads and network demands. Attributes such as routing_table_updates and security_group_updates indicate the changes made to the network configurations in response to real-time conditions. Methods like scaleOperations( ) adjust the network's capacity to meet demand, while updateRoutingTables( ) and updateSecurityGroups( ) ensure that routing and security configurations are up-to-date. This component ensures that the network remains robust and responsive to growth and fluctuations, maintaining high performance and reliability.

The Adaptive Algorithms (516) continuously learn from past network conditions to improve future performance. Attributes such as past_condition_learning and future_trend_prediction store the learned data and predictions, respectively. Methods like learnFromPastConditions( ) analyze historical data to understand previous network behaviors, while predictFutureTrends( ) forecasts future conditions based on past data. This continuous learning process allows the system to make proactive adjustments, enhancing the resilience and reliability of network operations.

The Cost Optimization Component (518) focuses on reducing operational expenses by optimizing data transfer costs. Attributes such as cost_optimization_parameters define the criteria for cost-effective operations. Methods like optimizeCosts( ) make routing decisions based on cost-effectiveness, while makeRoutingDecisions( ) selects the most economical routes. This component ensures efficient and economical network operations without compromising on performance, helping enterprises manage their network expenses effectively.

Finally, the User Experience Component (520) aims to enhance the overall user experience by improving network performance, reducing latency, and ensuring efficient data retrieval and transaction processing. Attributes such as user_experience_metrics measure the quality of the user experience. Methods like enhancePerformance( ) optimize network efficiency, and reduceLatency( ) minimizes delays in data transmission. This component is relevant for providing a superior service experience, leading to increased user satisfaction and loyalty.

In conclusion, FIG. 5 provides a detailed class diagram that illustrates the structural framework of the network optimization system. Each class is designed with specific attributes and methods that contribute to the system's overall functionality and efficiency. The interactions between these components ensure that the network operates optimally, adapts to real-time conditions, and maintains high standards of security and compliance. This detailed description underscores the importance of each component in achieving a robust and adaptive network management solution.

Figure 6:
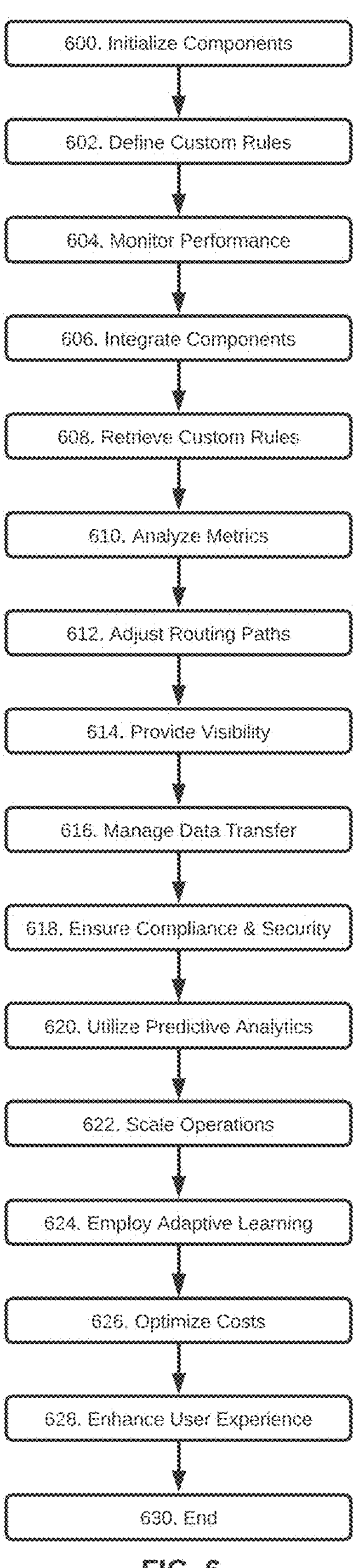
FIG. 6 shows exemplary main flow execution for sample pseudocode, which describes the initialization and interaction of various components within the network optimization system, covering steps such as defining custom rules, monitoring network performance, analyzing metrics, adjusting routing paths, managing data transfer, ensuring compliance and security, utilizing predictive analytics, scaling operations, employing adaptive learning, optimizing costs, and enhancing user experience.

FIG. 6, by way of non-limiting example, shows a sample main execution flow for the network optimization system involves initializing all the components and executing a series of steps to ensure the network is optimized for performance, security, and efficiency.

The process begins with the initialization of instances of all components in 600. This involves creating objects for each class, including RuleBasedConfigurationComponent, NetworkMonitoringTools, DynamicRouteOptimizationEngine, IntegrationComponent, MultiCloudHybridCloudManagementComponent, ComplianceAndSecurityComponent, PredictiveAnalyticsComponent, ScalabilityComponent, AdaptiveAlgorithms, CostOptimizationComponent, and UserExperienceComponent. This setup establishes the framework for the network optimization system, ensuring that each component is ready to perform its designated functions.

In 602, custom rules and parameters are defined using the RuleBasedConfigurationComponent. In this step, users specify rules and parameters that will govern the network's behavior. These custom rules might include cost calculations, transaction priorities, application inventories, and routing table configurations. The define_rules method is called to update the custom_rules attribute with user-defined rules, while set_parameters updates various parameter attributes. This customization allows the network to operate according to specific business needs and policies.

Following this in 604, the NetworkMonitoringTools component begins monitoring real-time network performance metrics. The monitor_performance method simulates the collection of critical metrics such as latency, bandwidth availability, memory utilization, CPU load, and throughput capacity. These metrics are stored in the metrics attribute and provide a snapshot of the current network performance. Accurate monitoring is essential for making informed decisions about network optimization.

The IntegrationComponent then integrates in 606 the NetworkMonitoringTools with the DynamicRouteOptimizationEngine. By the calling integrate_with_monitoring_tools method, the component collects performance metrics from the NetworkMonitoringTools and ensures that the DynamicRouteOptimizationEngine has access to up-to-date data. This integration ensures synchronized operations and continuous visibility into network performance, which is vital for real-time optimization.

Once the integration is complete, the DynamicRouteOptimizationEngine retrieves custom rules from the RuleBasedConfigurationComponent in 608. The retrieve_custom_rules method is called to access the custom_rules attribute, ensuring that the optimization engine has the necessary rules to guide its decision-making process. This step ensures that the optimization process adheres to user-defined policies and parameters.

The DynamicRouteOptimizationEngine then analyzes in 610 the collected performance metrics using the analyze_metrics method. This method processes the metrics to determine the most efficient routing paths for data transfer and processing. The analysis considers historical performance data and predefined optimization criteria to make informed decisions. The determine_optimal_routes method is called within analyze_metrics to identify the optimal routes based on the analyzed data.

Following the analysis, the DynamicRouteOptimizationEngine adjusts in 612 the routing paths based on the optimal routes determined. The adjust_routing_paths method is called to implement these changes, ensuring that data flows through the most efficient paths. This adjustment is relevant for minimizing latency, maximizing throughput, and avoiding network congestion.

The IntegrationComponent provides visibility into network performance metrics in 614 by calling the provide_visibility method. This step involves printing the current performance metrics to ensure that network administrators have a clear view of the network's status. Continuous visibility allows for timely interventions and adjustments, maintaining optimal network performance.

Data transfer across cloud environments is managed in 616 by the MultiCloudHybridCloudManagementComponent. The manage_data_transfer method simulates the management of data transfer across various cloud providers and on-premises resources. The select_optimal_environment method is called to dynamically choose the most suitable environment based on real-time network conditions and defined custom rules. This management ensures data compliance, cost efficiency, and optimal resource utilization.

Compliance and security are ensured by the ComplianceAndSecurityComponent in 618. The enforce_security_protocols method updates the security_protocols attribute with the provided protocols, while the ensure_compliance method checks that data is routed through compliant paths and prints the compliant paths. This step ensures that all data transfer and processing activities adhere to regulatory requirements and organizational security policies, maintaining data integrity and confidentiality.

The PredictiveAnalyticsComponent leverages historical data in 620 to analyze trends and anticipate potential issues. The analyze_historical_data method updates the historical_data attribute with the provided data, while the identify_trends method identifies patterns in the historical data. The anticipate_issues method predicts potential network congestion and other issues based on these trends, allowing for preemptive measures to mitigate identified risks.

The ScalabilityComponent dynamically scales network operations in 622 to handle varying workloads and demands. The scale_operations method simulates scaling operations, while the update_routing_tables and update_security_groups methods update the respective attributes with the provided updates. This dynamic scaling ensures resource availability and optimal performance, accommodating growth and fluctuations in network traffic.

Adaptive learning is employed by the AdaptiveAlgorithms component in 624, which continuously learns from past network conditions to predict future trends. The learn_from_past_conditions method updates the past_conditions attribute with historical data, while the predict_future_trends method forecasts future trends based on past conditions. This learning process allows the DynamicRouteOptimizationEngine to proactively adjust routing paths, continuously improving its accuracy and efficiency.

The CostOptimizationComponent focuses on optimizing data transfer costs. The optimize_costs method in 626 updates the cost_optimization_parameters attribute with the provided parameters, and the make_routing_decisions method returns the most cost-effective routing decisions. This optimization ensures cost-effective network operations without compromising performance.

Finally, the UserExperienceComponent enhances the overall user experience by improving network performance and reducing latency in 628. The enhance_performance method updates the user_experience_metrics attribute with the provided metrics, while the reduce_latency method simulates latency reduction. This component ensures efficient data retrieval and transaction processing, providing a superior service experience and high levels of user satisfaction.

In summary, the main execution flow involves initializing all components, defining custom rules, monitoring network performance, integrating components, analyzing metrics, adjusting routing paths, managing data transfer, ensuring compliance and security, utilizing predictive analytics, scaling operations, employing adaptive learning, optimizing costs, and enhancing user experience. Each step is carefully designed to ensure efficient, secure, and adaptive network management, highlighting the interactions and responsibilities of each component within the system.

Python pseudocode for classes and main code execution for the foregoing is set forth below for reference.

First, with respect to classes, the RuleBasedConfigurationComponent class is an essential part of the network optimization system, responsible for managing custom rules and parameters that govern various network operations. This class allows users to define and modify rules and parameters for transaction processing, data retrieval, user authorization, cost calculations, transaction priorities, application inventories, and routing table configurations.

a. Attributes:
   - i. custom_rules: A dictionary to store custom rules defined by users.
   - ii. transaction_processing_parameters: A dictionary to store parameters for transaction processing.
   - iii. data_retrieval_parameters: A dictionary to store parameters for data retrieval.
   - iv. user_authorization_parameters: A dictionary to store user authorization parameters.
   - v. cost_calculations: A dictionary to store cost calculation rules.
   - vi. transaction_priorities: A dictionary to store transaction priorities.
   - vii. application_inventories: A dictionary to store application inventories.
   - viii. routing_table_configurations: A dictionary to store routing table configurations.

b. Methods:
   - i. define_rules (rules): Updates the custom_rules attribute with the provided rules.
   - ii. set_parameters (parameters): Updates the various parameter attributes with the provided parameters.

The RuleBasedConfigurationComponent class begins with an_init_method that initializes its attributes. This method sets up several dictionaries: custom_rules, transaction_processing_parameters, data_retrieval_parameters, user_authorization_parameters, cost_calculations, transaction_priorities, application_inventories, and routing_table_configurations. These dictionaries are used to store user-defined rules and parameters, ensuring that the network operates according to specific business needs and policies.

The primary functionality of this class is implemented through two methods. The define_rules method takes a dictionary of rules as an argument and updates the custom_rules attribute with these new rules. This method allows users to define and modify the rules that the network will follow during its operations. By updating the custom_rules attribute, this method ensures that the latest user-defined rules are always in effect.

The set_parameters method takes a dictionary of parameters and updates various parameter-related attributes with the provided values. These attributes include transaction_processing_parameters, data_retrieval_parameters, user_authorization_parameters, cost_calculations, transaction_priorities, application_inventories, and routing_table_configurations. This method allows users to set and adjust various operational parameters that govern different aspects of the network. By updating these attributes, the set_parameters method ensures that the network operates according to the latest user-defined parameters.

In the context of the network optimization system, the RuleBasedConfigurationComponent class plays a role by allowing users to customize and configure the network's behavior. By managing user-defined rules and parameters, this class ensures that the network operates efficiently, securely, and in accordance with specific business needs and policies.

Sample pseudocode for this class could be as follows:

```
class RuleBasedConfigurationComponent:
  def__init_(self):
    # Initialize all attributes to empty dictionaries
    self.custom_rules={ }
    self.transaction_processing_parameters={ }
    self.data_retrieval_parameters={ }
    self.user_authorization_parameters={ }
    self.cost_calculations={ }
    self.transaction_priorities={ }
    self.application_inventories={ }
    self.routing_table_configurations={ }
  def define_rules(self, rules):
    # Update custom_rules with the provided rules
    self.custom_rules.update(rules)
    print(f"Defined rules: {self.custom_rules}")
  def set_parameters(self, parameters):
    # Update all parameter-related attributes with the
      provided parameters
    self.transaction_processing_parameters.update(parameters)
    self.data_retrieval_parameters.update(parameters)
    self.user_authorization_parameters.update(parameters)
    self.cost_calculations.update(parameters)
    self.transaction_priorities.update(parameters)
    self.application_inventories.update(parameters)
    self.routing_table_configurations.update(parameters)
    print(f"Set parameters: {parameters}")
```

The RuleBasedConfigurationComponent class starts with an _init_ method that initializes several attributes as empty dictionaries: custom_rules, transaction_processing_parameters, data_retrieval_parameters, user_authorization_parameters, cost_calculations, transaction_priorities, application_inventories, and routing_table_configurations. This setup prepares the class to store user-defined rules and parameters, ensuring that the network operates according to specific business needs and policies.

The primary functionality of this class is found in the define_rules method, which takes a dictionary of rules as an argument and updates the custom_rules attribute with these new rules. This method prints a statement indicating the defined rules, allowing users to define and modify the rules that the network will follow during its operations.

The set_parameters method is designed to update various parameter-related attributes with the provided values. This method takes a dictionary of parameters and updates the transaction_processing_parameters, data_retrieval_parameters, user_authorization_parameters, cost_calculations, transaction_priorities, application_inventories, and routing_table_configurations attributes. It prints a statement indicating the set parameters, ensuring that the network operates according to the latest user-defined parameters.

In summary, the RuleBasedConfigurationComponent class is a relevant part of the network optimization system, allowing users to customize and configure the network's behavior. By managing user-defined rules and parameters, this class ensures that the network operates efficiently, securely, and in accordance with specific business needs and policies.

The NetworkMonitoringTools class is a critical component in the network optimization system, responsible for continuously monitoring and collecting real-time network performance metrics. This class provides essential data that enables the optimization engine to make informed decisions about routing and data processing.

a. Attributes:
   i. metrics: A dictionary to store performance metrics such as latency, bandwidth availability, memory utilization, CPU load, and throughput capacity.

b. Methods:
   i. monitor_performance( ): Simulates the monitoring of f network performance by updating the 'metrics' dictionary with values obtained from specific methods ('get_latency( )', 'get_bandwidth_availability( )', etc.).
   ii. collect_metrics( ): Returns the current performance metrics.

The NetworkMonitoringTools class begins with an _init_ method, which initializes its attributes. This method sets up a dictionary named metrics that contains key performance metrics, such as latency, bandwidth availability, memory utilization, CPU load, and throughput capacity. These metrics are relevant for assessing the current state of the network and identifying areas that may need optimization.

The primary functionality of this class is implemented in the monitor_performance method. This method simulates the continuous monitoring of network performance by updating the values in the metrics dictionary. It calls several internal methods: get_latency, get_bandwidth_availability, get_memory_utilization, get_cpu_load, and get_throughput_ capacity. Each of these methods returns a simulated value for its respective metric. For instance, get_latency might return a value representing the current network latency, while get_bandwidth_availability provides the available bandwidth.

The monitor_performance method ensures that the metrics dictionary reflects the latest network performance data by gathering and updating these metrics. This real-time data is relevant for the optimization process, as it provides the DynamicRouteOptimizationEngine with the necessary information to analyze and adjust routing paths effectively.

Additionally, the class includes a collect_metrics method that returns the current performance metrics stored in the metrics dictionary. This method can be used by other components of the system, such as the IntegrationComponent, to access real-time network performance data.

In the context of the network optimization system, the NetworkMonitoringTools class plays an indispensable role by providing continuous, real-time insights into the network's performance. This information is essential for the DynamicRouteOptimizationEngine to make informed decisions about routing adjustments, ensuring that the network operates efficiently and effectively.

Sample pseudocode for this class could be as follows:

```
class NetworkMonitoringTools:
  def_init_(self):
    # Initialize the metrics dictionary with default values
    self.metrics={
      'latency': 0,
      'bandwidth_availability': 0,
      'memory_utilization': 0,
      'cpu_load': 0,
    'throughput_capacity': 0
  }
  def monitor_performance(self):
    # Simulate the monitoring of network performance
      by updating the metrics dictionary
    self.metrics ['latency']=self.get_latency( )
    self.metrics ['bandwidth_availability']=self.get-
      _bandwidth_availability( )
    self.metrics ['memory_utilization']=self.get_memo-
      ry_utilization( )
    self.metrics ['cpu_load']=self.get_cpu_load( )
    self.metrics ['throughput_capacity']=self.get-
      _throughput_capacity( )
  def get_latency(self):
    # Placeholder for actual latency monitoring logic
    return 10
  def get_bandwidth_availability(self):
    # Placeholder for actual bandwidth availability
      monitoring logic
    return 100
  def get_memory_utilization(self):
    # Placeholder for actual memory utilization moni-
      toring logic
    return 70
  def get_cpu_load(self):
    # Placeholder for actual CPU load monitoring logic
    return 50
  def get_throughput_capacity(self):
    # Placeholder for actual throughput capacity moni-
      toring logic
    return 80
  def collect_metrics(self):
    # Return the current performance metrics
    return self.metrics
```

The NetworkMonitoringTools class starts with an _init_ method that initializes a dictionary called metrics. This dictionary stores key performance metrics, including latency, bandwidth availability, memory utilization, CPU load, and throughput capacity. The main functionality of this class is found in the monitor_performance method, which simulates continuous monitoring by updating the metrics dictionary with values returned from several internal methods: get_latency, get_bandwidth_availability, get_memory_utilization, get_cpu_load, and get_throughput_capacity. Each of these methods provides a simulated value for its respective metric. The monitor_performance method ensures that the metrics dictionary is always up-to-date with the latest network performance data, which is relevant for the optimization process.

Additionally, the class includes a collect_metrics method that returns the current performance metrics stored in the metrics dictionary. This method can be used by other components of the system, such as the IntegrationComponent, to access real-time network performance data.

In summary, the NetworkMonitoringTools class plays a vital role in the network optimization system by continuously monitoring key performance metrics and providing real-time data necessary for informed decision-making by the DynamicRouteOptimizationEngine. This ensures that the network operates efficiently and effectively, with adjustments made based on accurate and current performance data.

The DynamicRouteOptimizationEngine class is a central component of the network optimization system. This class is responsible for analyzing real-time network performance metrics, determining optimal routing paths, and making adjustments to ensure efficient data transfer and processing.

a. Attributes:
   i. rules: A dictionary to store custom rules.
   ii. performance_metrics: A dictionary to store performance metrics.

b. Methods:
   i. analyze_metrics(metrics): Analyzes the provided metrics to determine optimal routes.
   ii. determine_optimal_routes( ): Placeholder method that returns optimal routing paths based on analysis.
   iii. adjust_routing_paths(routes): Adjusts routing paths according to the optimal routes determined.
   iv. retrieve_custom_rules(rule_component): Retrieves custom rules from the provided 'RuleBasedConfigurationComponent'.

The DynamicRouteOptimizationEngine class begins with an _init_ method that initializes its attributes. This method sets up two primary dictionaries: rules, which stores custom rules retrieved from the RuleBasedConfigurationComponent, and performance_metrics, which holds real-time network performance data collected by the NetworkMonitoringTools. This setup allows the class to manage and utilize both the rules that govern network behavior and the metrics that reflect its current performance.

The core functionality of this class is implemented through several methods. The analyze_metrics method takes a dictionary of performance metrics as an argument and processes these metrics to determine the most efficient routing paths for data transfer and processing. This method updates the performance_metrics attribute with the provided metrics and then calls the determine_optimal_routes method to analyze the data and identify the best routes. The determine_optimal_routes method is a placeholder that returns optimal routing paths based on the analyzed metrics. These paths are chosen to minimize latency, maximize throughput, and avoid network congestion.

Once the optimal routes are determined, the adjust_routing_paths method is called to implement these changes. This method takes the optimal routes as an argument and adjusts the network's routing paths accordingly. It ensures that data flows through the most efficient paths, improving overall network performance.

Additionally, the class includes a retrieve_custom_rules method that takes an instance of the RuleBasedConfigurationComponent as an argument and retrieves custom rules defined by the users. This method updates the rules attribute with the rules from the provided configuration component, ensuring that the optimization process adheres to user-defined policies and parameters.

In the context of the network optimization system, the DynamicRouteOptimizationEngine class plays a pivotal role by continuously analyzing performance data and adjusting routing paths to optimize network operations. By adhering to custom rules and processing real-time metrics, this class ensures that the network operates efficiently, securely, and in accordance with user-defined requirements.

Sample pseudocode for this class could be as follows:

```
class DynamicRouteOptimizationEngine:
  def_init_(self):
    # Initialize the rules and performance_metrics attributes to empty dictionaries
    self.rules={ }
    self.performance_metrics={ }
  def analyze_metrics(self, metrics):
    # Update the performance_metrics with the provided metrics
    self.performance_metrics=metrics
    # Determine the optimal routing paths based on the analyzed metrics
    optimal_routes=self.determine_optimal_routes( )
    return optimal_routes
  def determine_optimal_routes(self):
    # Placeholder for route determination logic
    # This method should analyze performance_metrics and return optimal routing paths
    return {'route1': 'optimized_path1', 'route2': 'optimized_path2'}
  def adjust_routing_paths(self, routes):
    # Adjust the routing paths based on the optimal routes determined
    print(f"Adjusting routing paths to: {routes}")
  def retrieve_custom_rules(self, rule_component):
    # Retrieve custom rules from the provided RuleBasedConfigurationComponent
    self.rules=rule_component.custom_rules
    print(f"Retrieved custom rules: {self.rules}")
```

The DynamicRouteOptimizationEngine class starts with an _init_method that initializes the rules and performance_metrics attributes as empty dictionaries. This setup prepares the class to store and manage the rules that govern network behavior and the metrics that reflect its current performance.

The primary functionality of this class is found in the analyze_metrics method, which takes performance metrics as input and updates the performance_metrics attribute. It then calls the determine_optimal_routes method to identify the best routing paths based on the analyzed metrics. The determine_optimal_routes method is a placeholder that returns optimal routing paths designed to minimize latency, maximize throughput, and avoid network congestion. After determining the optimal routes, the adjust_routing_paths method is called to implement these changes, adjusting the network's routing paths accordingly.

Additionally, the retrieve_custom_rules method retrieves custom rules from an instance of the RuleBasedConfigurationComponent, updating the rules attribute with the user-defined rules. This ensures that the optimization process adheres to the specific policies and parameters set by the users.

In summary, the DynamicRouteOptimizationEngine class is relevant for the network optimization system, continuously analyzing performance data and adjusting routing paths to ensure efficient, secure, and user-defined network operations.

The IntegrationComponent class is a vital part of the network optimization system, responsible for facilitating seamless communication and data exchange between the DynamicRouteOptimizationEngine and the NetworkMonitoringTools. This class ensures that real-time network performance metrics are integrated into the optimization process, providing continuous visibility into network performance.

a. Attributes:
  i. optimization_engine: An instance of the DynamicRouteOptimizationEngine.
  ii. monitoring_tools: An instance of the NetworkMonitoringTools.

b. Methods:
  i. integrate_with_monitoring_tools( ): Collects performance metrics from the NetworkMonitoringTools.
  ii. provide_visibility( ): Prints the current network performance metrics.

The IntegrationComponent class begins with an _init_ method that initializes its attributes. This method takes two arguments: an instance of the DynamicRouteOptimizationEngine and an instance of the NetworkMonitoringTools. These instances are assigned to the optimization_engine and monitoring_tools attributes, respectively, setting up the necessary connections for data integration and synchronization.

The core functionality of this class is implemented through several methods. The integrate_with_monitoring_tools method is responsible for collecting performance metrics from the NetworkMonitoringTools. It calls the collect_metrics method of the NetworkMonitoringTools instance and returns the collected metrics. This ensures that the DynamicRouteOptimizationEngine has access to accurate and up-to-date network performance data.

Additionally, the provide_visibility method is designed to offer continuous visibility into network performance. This method also calls the collect_metrics method of the NetworkMonitoringTools instance and prints the current performance metrics. By doing so, it provides network administrators with a clear and real-time view of the network's status, allowing for timely interventions and adjustments.

In the context of the network optimization system, the IntegrationComponent class plays an essential role by ensuring that real-time performance data is continuously fed into the optimization engine. This integration enables the DynamicRouteOptimizationEngine to make informed decisions about routing adjustments, thereby maintaining optimal network performance.

Sample pseudocode for this class could be as follows:

```
class IntegrationComponent:
  def__init_(self, optimization_engine, monitoring_tools):
    # Initialize the optimization_engine and monitoring_tools attributes
    self.optimization_engine=optimization_engine
    self.monitoring_tools=monitoring_tools
  def integrate_with_monitoring_tools (self):
    # Collect performance metrics from the NetworkMonitoringTools
    performance_metrics=self.monitoring_tools.collect_metrics( )
    return performance_metrics
  def provide_visibility (self):
    # Collect and print the current performance metrics to provide visibility
    performance_metrics=self.monitoring_tools.collect_metrics( )
    print(f"Network Performance Metrics: {performance_metrics}")
```

The IntegrationComponent class starts with an _init_ method that initializes the optimization_engine and monitoring_tools attributes by taking instances of the DynamicRouteOptimizationEngine and NetworkMonitoringTools as arguments. This setup ensures s that the necessary connections for data integration and synchronization are established.

The primary functionality of this class is found in the integrate_with_monitoring_tools method, which collects performance metrics from the NetworkMonitoringTools by calling its collect_metrics method. The collected metrics are then returned, providing the DynamicRouteOptimizationEngine with accurate and current data for analysis and optimization.

Additionally, the provide_visibility method is designed to offer continuous visibility into network performance. This method collects the current performance metrics from the NetworkMonitoringTools and prints them, giving network administrators a real-time view of the network's status. This visibility is relevant for making timely adjustments and interventions to maintain optimal network performance.

In summary, the IntegrationComponent class is a part of the network optimization system, ensuring that real-time performance data is continuously fed into the optimization engine. By facilitating seamless communication and data exchange between the DynamicRouteOptimizationEngine and the NetworkMonitoringTools, this class helps maintain efficient and effective network operations.

The MultiCloudHybridCloudManagementComponent class is a component of the network optimization system, responsible for managing data transfer and processing across multiple cloud environments. This class dynamically selects the most appropriate cloud provider or on-premises resource based on real-time network conditions and defined custom rules, ensuring data compliance and cost efficiency.

a. Attributes:
  i. suitable_cloud_provider': The selected cloud provider.
  ii. on_premises_resource': The selected on-premises resource.

b. Methods:
  i. manage_data_transfer( ): Simulates the management of data transfer across cloud environments.
  ii. select_optimal_environment(rules): Selects the most suitable cloud provider or on-premises resource based on the provided rules.

The MultiCloudHybridCloudManagementComponent class begins with an init method that initializes its attributes. This method sets up three primary attributes: suitable_cloud_ provider, on_premises_resource, and data_transfer_management. These attributes are used to store information about the selected cloud provider, the selected on-premises resource, and the overall data transfer management strategy, respectively.

The core functionality of this class is implemented through several methods. The manage_data_transfer method simulates the management of data transfer across various cloud environments. This method prints a statement indicating that data transfer across cloud environments is being managed, reflecting the class's responsibility for overseeing data movement and processing in a multi-cloud setup.

The select_optimal_environment method takes custom rules as an argument and dynamically selects the most suitable cloud provider or on-premises resource based on real-time network conditions and these rules. This method updates the suitable_cloud_provider and on_premises_resource attributes with the selected environments. The selection process ensures that data is transferred and processed in the most efficient and cost-effective manner, adhering to the defined custom rules.

In the context of the network optimization system, the MultiCloudHybridCloudManagementComponent class plays a vital role by ensuring that data transfer and processing are optimized across multiple cloud environments. By dynamically selecting the most appropriate environments based on real-time conditions and user-defined rules, this class helps maintain efficient, compliant, and cost-effective network operations.

Sample pseudocode for this class could be:

```
class MultiCloudHybridCloudManagementComponent:
  def__init_(self):
    # Initialize the attributes to store cloud provider,
      on-premises resource, and data transfer management information
    self.suitable_cloud_provider=None
    self.on_premises_resource=None
    self.data_transfer_management=None
  def manage_data_transfer (self):
    # Simulate the management of data transfer across
      cloud environments
    print("Managing data transfer across cloud environments")
  def select_optimal_environment(self, rules):
    # Placeholder for environment selection logic based
      on custom rules
    # Update the suitable_cloud_provider and
      on_premises_resource attributes
    self.suitable_cloud_provider="Optimal_Cloud_Provider"
    self.on_premises_resource="Optimal_On_Premises_Resource"
    print(f"Selected cloud provider: {self.suitable_cloud_provider}")
    print(f"Selected on-premises resource: {self.on_premises_resource}")
```

The MultiCloudHybridCloudManagementComponent class starts with an _init_ method that initializes the suitable_ cloud_provider, on_premises_resource, and data_transfer_management attributes as None. This setup prepares the class to store information about the selected cloud environments and data transfer strategies.

The primary functionality of this class is found in the manage_data_transfer method, which simulates the management of data transfer across various cloud environments. This method prints a statement indicating that data transfer is being managed, reflecting the class's responsibility for overseeing data movement and processing in a multi-cloud setup.

Additionally, the select_optimal_environment method is designed to dynamically select the most suitable cloud provider or on-premises resource based on custom rules. This method takes a set of rules as an argument and updates the suitable_cloud_provider and on_premises_resource attributes with the selected environments. The selection process ensures that data is transferred and processed in the most efficient and cost-effective manner, adhering to the defined custom rules.

In summary, the MultiCloudHybridCloudManagementComponent class is a part of the network optimization system, ensuring that data transfer and processing are optimized across multiple cloud environments. By dynamically selecting the most appropriate environments based on real-time conditions and user-defined rules, this class helps maintain efficient, compliant, and cost-effective network operations.

The ComplianceAndSecurityComponent class is an integral part of the network optimization system, tasked with ensuring that all data transfer and processing activities adhere to regulatory requirements and organizational security policies. This class maintains data integrity and confidentiality by automatically routing data through compliant paths and enforcing security protocols.

a. Attributes:
  i. security_protocols: A dictionary to store security protocols.
  ii. compliant_paths: A list to store compliant data paths.
b. Methods:
  i. enforce_security_protocols(protocols): Updates the 'security_protocols' attribute with the provided protocols.
  ii. ensure_compliance(data_paths): Ensures that data is routed through compliant paths and prints the compliant paths.

The ComplianceAndSecurityComponent class begins with an _init_ method that initializes its attributes. This method sets up three primary attributes: security_protocols, compliant_paths, and regulatory_considerations. These attributes are dictionaries and lists used to store security protocols, paths that meet compliance standards, and any regulatory considerations that need to be accounted for in the data routing process.

The core functionality of this class is implemented through several methods. The enforce_security_protocols method takes a dictionary of protocols as an argument and updates the security_protocols attribute with these new protocols. This ensures that the latest security measures are always enforced in the network, maintaining the integrity and confidentiality of the data.

Additionally, the ensure_compliance method takes a list of data paths as an argument and checks these paths against the compliance standards stored in the compliant_paths attribute. This method updates the compliant_paths attribute with the provided paths and prints a statement indicating which paths have been verified for compliance. This step is relevant for ensuring that data routing adheres to regulatory requirements and organizational policies.

In the context of the network optimization system, the ComplianceAndSecurityComponent class plays a vital role by continuously enforcing security protocols and ensuring compliance with relevant regulations. By maintaining up-to-date security measures and verifying compliant paths, this class helps safeguard the network against potential threats and ensures that all data handling processes meet necessary standards.

Sample pseudocode for this class could be:

```
class ComplianceAndSecurityComponent:
  def_init_(self):
    # Initialize the attributes to store security protocols,
      compliant paths, and regulatory considerations
    self.security_protocols={ }
    self.compliant_paths=[ ]
    self.regulatory_considerations={ }
  def enforce_security_protocols(self, protocols):
    # Update the security_protocols attribute with the
      provided protocols
    self.security_protocols.update(protocols)
```

```
print(f"Enforced security protocols: {self.security_protocols}")
def ensure_compliance(self, data_paths):
    # Update the compliant_paths attribute with the provided data paths and print them
    self.compliant_paths.extend(data_paths)
    print(f"Ensured compliance for paths: {self.compliant_paths}")
```

The ComplianceAndSecurityComponent class starts with an _init_method that initializes the security_protocols, compliant_paths, and regulatory_considerations attributes. These attributes are set up as a dictionary for security protocols, a list for compliant paths, and a dictionary for regulatory considerations, respectively. This initialization ensures that the class is prepared to handle the necessary data for maintaining compliance and security.

The primary functionality of this class is found in the enforce_security_protocols method, which takes a dictionary of protocols as an argument and updates the security_protocols attribute with these new protocols. This method prints a statement indicating the enforced protocols, ensuring that the network adheres to the latest security measures.

Additionally, the ensure_compliance method is designed to verify data paths against compliance standards. This method takes a list of data paths as an argument, updates the compliant_paths attribute with these paths, and prints a statement indicating which paths have been verified for compliance. This verification process is relevant for maintaining regulatory compliance and adhering to organizational policies.

In summary, the ComplianceAndSecurityComponent class is a part of the network optimization system, ensuring that all data transfer and processing activities adhere to regulatory requirements and organizational security policies. By continuously enforcing security protocols and verifying compliant paths, this class helps safeguard the network against potential threats and ensures that all data handling processes meet necessary standards.

The PredictiveAnalyticsComponent class is a component of the network optimization system, responsible for leveraging historical data to analyze trends and anticipate network congestion and potential issues before they occur. This class uses predictive analytics to enable preemptive measures that mitigate identified risks and ensure smooth network operations.

a. Attributes:
   i. historical_data: A dictionary to store historical data.
   ii. trend_identification: A dictionary to store identified trends.
   iii. congestion_anticipation: A dictionary to store anticipated congestion issues.

b. Methods:
   i. analyze_historical_data(data): Updates the 'historical_data' attribute with the provided data.
   ii. identify_trends( ): Identifies trends in the historical data.
   iii. anticipate_issues( ): Anticipates potential issues based on the identified trends.

The PredictiveAnalyticsComponent class begins with an _init_ method that initializes its attributes. This method sets up three primary attributes: historical_data, trend_identification, and congestion_anticipation. These attributes are used to store past network performance data, identified trends based on this data, and anticipated congestion or potential issues, respectively.

The core functionality of this class is implemented through several methods. The analyze_historical_data method takes a dictionary of historical data as an argument and updates the historical_data attribute with this new data. This method is relevant for building a comprehensive dataset that reflects past network conditions, which is essential for accurate trend analysis and prediction.

The identify_trends method processes the historical data stored in the historical_data attribute to identify patterns and trends. This method updates the trend_identification attribute with the identified trends, providing insights into recurring network behaviors and potential areas of concern.

Additionally, the anticipate_issues method uses the identified trends to forecast potential network congestion and other issues. This method updates the congestion_anticipation attribute with the anticipated issues, enabling the network optimization system to take preemptive measures to mitigate these risks.

In the context of the network optimization system, the PredictiveAnalyticsComponent class plays a vital role by continuously analyzing historical data to predict future network conditions. By identifying trends and anticipating potential issues, this class ensures that the network operates smoothly and efficiently, with minimal disruptions.

Sample pseudocode for this class could be:

```
class PredictiveAnalyticsComponent:
    def__init_(self):
        # Initialize the attributes to store historical data, identified trends, and anticipated congestion
        self.historical_data={ }
        self.trend_identification={ }
        self.congestion_anticipation={ }
    def analyze_historical_data(self, data):
        # Update the historical_data attribute with the provided data
        self.historical_data.update(data)
        print(f"Analyzed historical data: {self.historical_data}")
    def identify_trends(self):
        # Placeholder for trend identification logic based on historical data
        # Update the trend_identification attribute with identified trends
        self.trend_identification={"trend1": "data1", "trend2": "data2"}
        print(f"Identified trends: {self.trend_identification}")
    def anticipate_issues(self):
        # Placeholder for issue anticipation logic based on identified trends
        # Update the congestion_anticipation attribute with anticipated issues
        self.congestion_anticipation={"issue1": "prediction1", "issue2": "prediction2"}
        print(f"Anticipated issues: {self.congestion_anticipation}")
```

The PredictiveAnalyticsComponent class starts with an _init_ method that initializes the historical_data, trend_identification, and congestion_anticipation attributes as empty dictionaries. This setup prepares the class to store and process historical network performance data, identified trends, and anticipated issues, respectively. The primary functionality of this class is found in the analyze_historical_data method, which takes a dictionary of historical data as an argument and updates the historical_data attribute with this new data. This method prints a statement indicating the analyzed historical data, building a comprehensive dataset for trend analysis.

The identify_trends method processes the historical data to identify patterns and trends. This method updates the trend_identification attribute with the identified trends and prints a statement indicating the identified trends. This step provides insights into recurring network behaviors and potential areas of concern.

Additionally, the anticipate_issues method uses the identified trends to forecast potential network congestion and other issues. This method updates the congestion_anticipation attribute with the anticipated issues and prints a statement indicating the anticipated issues. This forecasting enables the network optimization system to take preemptive measures to mitigate these risks.

In summary, the PredictiveAnalyticsComponent class is a part of the network optimization system, continuously analyzing historical data to predict future network conditions. By identifying trends and anticipating potential issues, this class ensures that the network operates smoothly and efficiently, with minimal disruptions.

The ScalabilityComponent class is a vital part of the network optimization system, responsible for dynamically scaling network operations to handle varying workloads and network demands. This class ensures that the network can adapt to changing conditions by automatically updating routing tables and security groups based on real-time metrics.

a. Attributes:
   i. routing_table_updates: A dictionary to store routing table updates.
   ii. security_group_updates: A dictionary to store security group updates.

b. Methods:
   i. scale_operations( ): Simulates scaling network operations.
   ii. update_routing_tables(updates): Updates the 'routing_table_updates' attribute with the provided updates.
   iii. update_security_groups(updates): Updates the 'security_group_updates' attribute with the provided updates.

The ScalabilityComponent class begins with an _init_ method that initializes its attributes. This method sets up two primary attributes: routing_table_updates and security_group_updates. These attributes are dictionaries used to store updates to routing tables and security groups, ensuring that the network can dynamically adapt to varying conditions.

The core functionality of this class is implemented through several methods. The scale_operations method simulates the scaling of network operations by adjusting the network's capacity to meet changing demands. This method prints a statement indicating that network operations are being scaled dynamically, reflecting the class's role in maintaining optimal performance.

The update_routing_tables method takes a dictionary of updates as an argument and updates the routing_table_updates attribute with these new values. This method ensures that the routing tables are kept current, allowing the network to route data efficiently based on the latest performance metrics.

Additionally, the update_security_groups method takes a dictionary of updates as an argument and updates the security_group_updates attribute with these new values. This method ensures that the security groups are up-to-date, maintaining the network's security posture even as it scales to accommodate new workloads and demands.

In the context of the network optimization system, the ScalabilityComponent class plays a role by enabling the network to dynamically adjust its operations in response to real-time conditions. By updating routing tables and security groups, this class helps maintain the network's efficiency, security, and performance.

Sample pseudocode for this class could be:

```
class ScalabilityComponent:
    def__init_(self):
        # Initialize the attributes to store routing table
          updates and security group updates
        self.routing_table_updates={ }
        self.security_group_updates={ }
    def scale_operations(self):
        # Simulate scaling network operations dynamically
        print("Scaling network operations dynamically")
    def update_routing_tables(self, updates):
        # Update the routing_table_updates attribute with
          the provided updates
        self.routing_table_updates.update(updates)
        print(f"Updated routing tables: {self.routing_table_
          updates}")
    def update_security_groups(self, updates):
        # Update the security_group_updates attribute with
          the provided updates
        self.security_group_updates.update(updates)
        print(f"Updated security groups: {self.security_
          group_updates}")
```

The ScalabilityComponent class starts with an _init_ method that initializes the routing_table_updates and security_group_updates attributes as empty dictionaries. This setup prepares the class to store updates to routing tables and security groups, ensuring that the network can dynamically adapt to varying conditions.

The primary functionality of this class is found in the scale_operations method, which simulates the dynamic scaling of network operations. This method prints a statement indicating that network operations are being scaled, reflecting the class's role in maintaining optimal performance.

The update_routing_tables method is designed to keep the routing tables current by taking a dictionary of updates as an argument and updating the routing_table_updates attribute with these new values. This method prints a statement indicating the updated routing tables, ensuring that the network can route data efficiently based on the latest performance metrics.

Additionally, the update_security_groups method ensures that the security groups are up-to-date by taking a dictionary of updates as an argument and updating the security_group_updates attribute with these new values. This method prints a statement indicating the updated security groups, maintaining the network's security posture even as it scales to accommodate new workloads and demands.

In summary, the ScalabilityComponent class is a part of the network optimization system, enabling the network to dynamically adjust its operations in response to real-time conditions. By updating routing tables and security groups, this class helps maintain the network's efficiency, security, and performance.

The AdaptiveAlgorithms class is a critical component of the network optimization system, responsible for continuously learning from past network conditions and predicting future trends to proactively adjust routing paths. This class utilizes adaptive algorithms to enhance the accuracy and efficiency of the optimization engine.

a. Attributes:
   i. past_conditions: A dictionary to store past network conditions.

ii. future_trends: A dictionary to store predicted future trends.

b. Methods:

i. learn_from_past_conditions(data): Updates the 'past_conditions' attribute with the provided data.

ii. predict_future_trends( ): Predicts future trends based on past conditions.

The AdaptiveAlgorithms class begins with an _init_ method that initializes its attributes. This method sets up two primary attributes: past_conditions and future_trends. These attributes are dictionaries used to store historical network conditions and predicted future trends, respectively. This setup allows the class to keep track of past performance and use this data to make informed predictions about future network behavior.

The core functionality of this class is implemented through several methods. The learn_from_past_conditions method takes a dictionary of past conditions as an argument and updates the past_conditions attribute with this new data. This method is relevant for building a comprehensive dataset that reflects historical network performance, which is essential for accurate learning and prediction.

The predict_future_trends method processes the data stored in the past_conditions attribute to predict future trends. This method updates the future_trends attribute with the predicted trends, providing insights into potential future network behaviors and areas of concern. The predictions made by this method enable the network optimization system to proactively adjust routing paths and other parameters to maintain optimal performance.

In the context of the network optimization system, the AdaptiveAlgorithms class plays a vital role by continuously learning from historical data and predicting future network conditions. By leveraging adaptive algorithms, this class ensures that the network operates efficiently and can anticipate and adapt to changes in real-time.

Sample pseudocode for this class could be:

```
class AdaptiveAlgorithms:
    def_init_(self):
        # Initialize the attributes to store past network conditions and predicted future trends
        self.past_conditions={ }
        self.future_trends={ }
    def learn_from_past_conditions(self, data):
        # Update the past_conditions attribute with the provided data
        self.past_conditions.update(data)
        print(f"Learned from past conditions: {self.past_conditions}")
    def predict_future_trends(self):
        # Placeholder for future trend prediction logic based on past conditions
        # Update the future_trends attribute with predicted trends
        self.future_trends={"trend1": "prediction1", "trend2": "prediction2"}
        print(f"Predicted future trends: {self.future_trends}")
```

The AdaptiveAlgorithms class starts with an _init_ method that initializes the past_conditions and future_trends attributes as empty dictionaries. This setup prepares the class to store historical network conditions and predicted future trends, allowing it to use past data to make informed predictions about future network behavior.

The primary functionality of this class is found in the learn_from_past_conditions method, which takes a dictionary of past conditions as an argument and updates the past_conditions attribute with this new data. This method prints a statement indicating the learned past conditions, building a comprehensive dataset for accurate learning and prediction.

The predict_future_trends method processes the data stored in the past_conditions attribute to predict future trends. This method updates the future_trends attribute with the predicted trends and prints a statement indicating the predicted future trends. The predictions made by this method enable the network optimization system to proactively adjust routing paths and other parameters to maintain optimal performance.

In summary, the AdaptiveAlgorithms class is a part of the network optimization system, continuously learning from historical data and predicting future network conditions. By leveraging adaptive algorithms, this class ensures that the network operates efficiently and can anticipate and adapt to changes in real-time.

The CostOptimizationComponent class is a key part of the network optimization system, responsible for reducing operational expenses by making intelligent routing decisions based on real-time data and custom rules. This class ensures cost-effective network operations without compromising performance.

a. Attributes:

i. cost_optimization_parameters: A dictionary to store cost optimization parameters.

b. Methods:

i. optimize_costs(parameters): Updates the 'cost_optimization_parameters' attribute with the provided parameters.

ii. make_routing_decisions( ): Returns the most cost-effective routing decisions.

The CostOptimizationComponent class begins with an init method that initializes its attributes. This method sets up a primary attribute: cost_optimization_parameters, which is a dictionary used to store parameters that influence cost optimization strategies. This setup allows the class to manage and utilize cost-related data effectively.

The core functionality of this class is implemented through several methods. The optimize_costs method takes a dictionary of parameters as an argument and updates the cost_optimization_parameters attribute with these new values. This method ensures that the latest cost considerations are always factored into the network optimization process, maintaining a focus on cost efficiency.

Additionally, the make_routing_decisions method is designed to make intelligent routing decisions based on the real-time data and the parameters stored in cost_optimization_parameters. This method returns a dictionary of routing decisions that are optimized for cost-effectiveness. The decisions made by this method help minimize operational expenses while ensuring that network performance remains high.

In the context of the network optimization system, the CostOptimizationComponent class plays a vital role by continuously optimizing data transfer costs. By making intelligent routing decisions based on real-time data and user-defined parameters, this class ensures that the network operates in a cost-effective manner without compromising on performance.

Sample pseudocode for this class could be:

```
class CostOptimizationComponent:
    def_init_(self):
        # Initialize the attribute to store cost optimization parameters
        self.cost_optimization_parameters={ }
```

```
def optimize_costs(self, parameters):
    # Update the cost_optimization_parameters attribute with the provided parameters
    self.cost_optimization_parameters.update(parameters)
    print(f"Optimized costs with parameters: {self.cost_optimization_parameters}")
def make_routing_decisions(self):
    # Placeholder for intelligent routing decision logic based on cost optimization
    # Return the most cost-effective routing decisions
    routing_decisions={"route1": "cost_effective_path1", "route2": "cost_effective_path2"}
    print(f"Made routing decisions: {routing_decisions}")
    return routing_decisions
```

The CostOptimizationComponent class starts with an _init_ method that initializes the cost_optimization_parameters attribute as an empty dictionary. This setup prepares the class to store parameters that influence cost optimization strategies, allowing it to manage and utilize cost-related data effectively.

The primary functionality of this class is found in the optimize_costs method, which takes a dictionary of parameters as an argument and updates the cost_optimization_parameters attribute with these new values. This method prints a statement indicating the optimized costs based on the provided parameters, ensuring that the latest cost considerations are always factored into the network optimization process.

The make_routing_decisions method is designed to make intelligent routing decisions based on the real-time data and the parameters stored in cost_optimization_parameters. This method returns a dictionary of routing decisions that are optimized for cost-effectiveness and prints a statement indicating the made routing decisions. These decisions help minimize operational expenses while ensuring that network performance remains high.

In summary, the CostOptimizationComponent class is a part of the network optimization system, continuously optimizing data transfer costs by making intelligent routing decisions based on real-time data and user-defined parameters. This class ensures that the network operates in a cost-effective manner without compromising on performance.

The UserExperienceComponent class is an essential part of the network optimization system, focused on enhancing the overall user experience by improving network performance, reducing latency, and ensuring efficient data retrieval and transaction processing. This class ensures that users have a smooth and reliable experience when interacting with the network.

a. Attributes:
   i. user_experience_metrics': A dictionary to store user experience metrics.
b. Methods:
   i. enhance_performance(metrics): Updates the 'user_experience_metrics' attribute with the provided metrics.
   ii. reduce_latency( ): Simulates reducing latency to improve user experience.

The UserExperienceComponent class begins with an _init_ method that initializes its attributes. This method sets up a primary attribute: user_experience_metrics, which is a dictionary used to store metrics that influence user experience, such as network performance, latency, and transaction processing times. This setup allows the class to manage and utilize user experience-related data effectively.

The core functionality of this class is implemented through several methods. The enhance_performance method takes a dictionary of metrics as an argument and updates the user_experience_metrics attribute with these new values. This method ensures that the latest performance metrics are always considered in the user experience optimization process, maintaining a focus on enhancing network performance.

Additionally, the reduce_latency method is designed to specifically target and reduce network latency. This method updates the user_experience_metrics attribute by optimizing the metrics related to latency and prints a statement indicating the improvements made. By focusing on reducing latency, this method helps ensure that data retrieval and transaction processing are quick and efficient.

In the context of the network optimization system, the UserExperienceComponent class plays a vital role by continuously optimizing the aspects of the network that directly impact user satisfaction. By enhancing performance and reducing latency, this class ensures that users have a high-quality experience when interacting with the network.

Sample pseudocode for the UserExperienceComponent can be as follows:

```
class UserExperienceComponent:
    def__init(self):
        # Initialize the attribute to store user experience metrics
        self.user_experience_metrics={ }
    def enhance_performance(self, metrics):
        # Update the user_experience_metrics attribute with the provided metrics
        self.user_experience_metrics.update(metrics)
        print(f"Enhanced performance with metrics: {self.user_experience_metrics}")
    def reduce_latency(self):
        # Placeholder for latency reduction logic
        # Update the user_experience_metrics attribute by optimizing latency-related metrics
        if 'latency' in self.user_experience_metrics:
            self.user_experience_metrics ['latency']=max (0, self.user_experience_metrics ['latency']-10)
        print(f"Reduced latency, updated metrics: {self.user_ experience_metrics}")
```

The UserExperienceComponent class starts with an _init_ method that initializes the user_experience_metrics attribute as an empty dictionary. This setup prepares the class to store metrics that influence user experience, allowing it to manage and utilize user experience-related data effectively.

The primary functionality of this class is found in the enhance_performance method, which takes a dictionary of metrics as an argument and updates the user_experience_metrics attribute with these new values. This method prints a statement indicating the enhanced performance based on the provided metrics, ensuring that the latest performance metrics are always considered in the user experience optimization process.

The reduce_latency method is designed to specifically target and reduce network latency. This method updates the user_experience_metrics attribute by optimizing the metrics related to latency and prints a statement indicating the improvements made. By focusing on reducing latency, this method helps ensure that data retrieval and transaction processing are quick and efficient, directly enhancing the overall user experience.

In summary, the UserExperienceComponent class is a part of the network optimization system, continuously optimizing the aspects of the network that directly impact user satisfaction. By enhancing performance and reducing latency, this class ensures that users have a high-quality experience when interacting with the network.

Regarding pseudocode for execution of sample primary flow, the following could be utilized:

```
def main( ):
    # Initialize components
    rule_based_config=RuleBasedConfiguration
        Component( )
    network_monitoring=NetworkMonitoringTools( )
    optimization_engine=DynamicRouteOptimization
        Engine( )
    integration_component IntegrationComponent(optimi-
        zation_engine, network_monitoring)
    multi_cloud_management=MultiCloudHybridCloud
        ManagementComponent( )
    compliance_security=ComplianceAndSecurity
        Component( )
    predictive_analytics=PredictiveAnalyticsComponent
        ( )
    scalability_component=ScalabilityComponent( )
    adaptive_algorithms=AdaptiveAlgorithms( )
    cost_optimization=CostOptimizationComponent( )
    user_experience=UserExperienceComponent( )
    # Define custom rules and parameters
    custom_rules={
        "rule1": "value1",
        "rule2": "value2"
    }
    parameters={
        "transaction_processing_parameters":{"param1":
            "value1"},
        "data_retrieval_parameters": {"param2": "value2"},
        "user_authorization_parameters": 55 "param3":
            "value3"},
        "cost_calculations": {"param4": "value4"},
        "transaction_priorities": {"param5": "value5"},
        "application_inventories": {"param6": "value6"},
        "routing_table_configurations": {"param7":
            "value7"}
    }
    rule_based_config.define_rules(custom_rules)
    rule_based_config.set_parameters(parameters)
    # Monitor network performance
    network_monitoring.monitor_performance( )
    # Integrate components and collect metrics
    performance_metrics
  integration_component.integrate_with_monitoring_
  tools( )=
    # Retrieve and apply custom rules
    optimization_engine.retrieve_custom_rules(rule_
        based_config)
    # Analyze metrics and determine optimal routes
    optimal_routes=optimization_engine.analyze_metrics
        (performance_metrics)
    optimization_engine.adjust_routing_paths(optimal_
        routes)
    # Manage data transfer across multi-cloud environ-
        ments
    multi_cloud_management.manage_data_transfer( )
    multi_cloud_management.select_optimal_environ-
        ment(custom_rules)
    # Ensure compliance and security
    compliance_security.enforce_security_protocols
        ({"protocol1": "value1"})
    compliance_security.ensure_compliance(["path1",
        "path2"])
    # Utilize predictive analytics for proactive management
    predictive_analytics.analyze_historical_data({"data1":
        "value1", "data2": "value2"})
    predictive_analytics.identify_trends( )
    predictive_analytics.anticipate_issues( )
    # Scale network operations dynamically
    scalability_component.scale_operations( )
    scalability_component.update_routing_tables
        ({"route1":"path1", "route2": "path2"})
    scalability_component.update_security_groups
        ({"group1": "value1", "group2": "value2"})
    # Employ adaptive algorithms to refine predictions
    adaptive_algorithms.learn_from_past_conditions
        ({"condition1": "value1", "condition2": "value2"})
    adaptive_algorithms.predict_future_trends( )
    # Optimize costs based on real-time data
    cost_optimization.optimize_costs ({"cost_param1":
        "value1", "cost_param2": "value2"})
    routing_decisions=cost_optimization.make_routing_
        decisions( )
    # Enhance user experience by improving performance
    user_experience.enhance_performance({"metric1":
        "value1", "metric2": "value2"})
    user_experience.reduce_latency( )
    print("Network optimization execution completed suc-
        cessfully.")
if _name_=="_main_":
    main( )
```

Set forth below is an explanation of the main execution pseudocode:

a. Initialization of Components: The first step involves creating instances of all the necessary components, including RuleBasedConfigurationComponent, NetworkMonitoringTools, DynamicRouteOptimizationEngine, MultiCloudHybridCloudManagementComponent, IntegrationComponent, ComplianceAndSecurityComponent, PredictiveAnalyticsComponent, ScalabilityComponent, AdaptiveAlgorithms, CostOptimizationComponent, and UserExperienceComponent. These instances are initialized to set up the network optimization system.

b. Defining Custom Rules and Parameters: Custom rules and parameters that govern network operations are defined and set using the RuleBasedConfigurationComponent instance. The define_rules method is called with a dictionary of rules, and the set_parameters method is called with a dictionary of parameters.

c. Monitoring Network Performance: The NetworkMonitoringTools instance is used to monitor the real-time performance of the network. The monitor_performance method updates the performance metrics.

d. Integrating Components and Collecting Metrics: The IntegrationComponent integrates the NetworkMonitoringTools with the DynamicRouteOptimizationEngine by collecting the performance metrics using the integrate_with_monitoring_tools method.

e. Retrieving and Applying Custom Rules: The DynamicRouteOptimizationEngine retrieves the custom rules defined earlier by using the retrieve_custom_rules method.

f. Analyzing Metrics and Determining Optimal Routes: The performance metrics collected are analyzed to determine the optimal routing paths for data transfer and processing. The analyze_metrics method processes these metrics, and the adjust_routing_paths method applies the optimal routes.

g. Managing Data Transfer Across Multi-Cloud Environments: The MultiCloudHybridCloudManagementComponent manages data transfer across various cloud environments. The manage_data_transfer and select_optimal_environment methods are called to handle this process efficiently.

h. Ensuring Compliance and Security: The ComplianceAndSecurityComponent ensures that all data transfers and processing activities comply with regulatory requirements and security protocols. The enforce_security_protocols and ensure_compliance methods are used for this purpose.

i. Utilizing Predictive Analytics for Proactive Management: Historical data is analyzed to identify trends and anticipate potential network issues using the PredictiveAnalyticsComponent. The analyze_historical_data, identify_trends, and anticipate_issues methods are called to enable proactive management.

j. Scaling Network Operations Dynamically: The ScalabilityComponent dynamically scales network operations to handle varying workloads and demands. The scale_operations, update_routing_tables, and update_security_groups methods are used to ensure that the network adapts to changing conditions.

k. Employing Adaptive Algorithms to Refine Predictions: The AdaptiveAlgorithms class learns from past network conditions and predicts future trends. The learn_from_past_conditions and predict_future_trends methods refine these predictions to improve network efficiency.

l. Optimizing Costs Based on Real-Time Data: The CostOptimizationComponent optimizes operational expenses by making intelligent routing decisions based on real-time data. The optimize_costs and make_routing_decisions methods ensure cost-effective network operations.

m. Enhancing User Experience by Improving Performance: The UserExperienceComponent enhances overall user experience by improving network performance and reducing latency. The enhance_performance and reduce_latency methods ensure efficient data retrieval and transaction processing.

n. Completion of Network Optimization Execution: Finally, a message is printed to indicate that the network optimization execution has been completed successfully.

Thus, this exemplary main execution flow ties together the functionalities of all components in the network optimization system, ensuring efficient, secure, and user-centric network operations.

Figure 7:
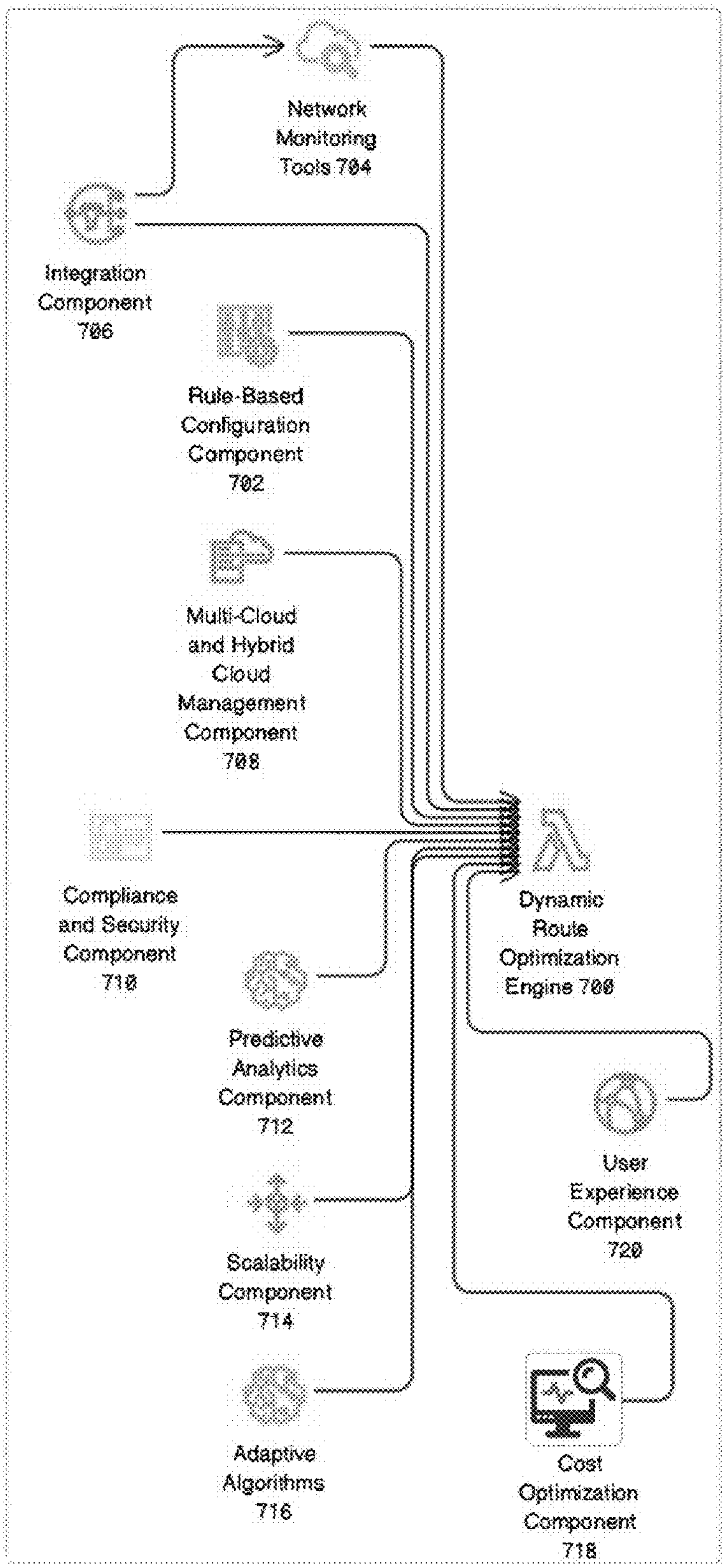
FIG. 7 illustrates a sample architecture diagram for a dynamic route optimizing system, showing the integration and interaction of various components such as the dynamic route optimization engine, network monitoring tools, rule-based configuration component, and other associated elements necessary for optimizing network routing and data processing.

FIG. 7 presents a comprehensive architecture for a dynamic route optimizing system designed to optimize network routing and data processing. At the center of this system is the Dynamic Route Optimization Engine (700), which is configured to analyze real-time network performance metrics and adjust routing paths to optimize data transfer and processing. This engine utilizes artificial intelligence and machine learning algorithms to enhance its decision-making processes, analyzing metrics such as latency, bandwidth availability, memory utilization, CPU load, and throughput capacity. By adjusting routing paths based on these analyzed metrics, the engine minimizes latency and maximizes throughput, ensuring efficient network operations.

The Rule-Based Configuration Component (702) allows users to define custom rules and parameters for transaction processing, data retrieval, and user authorization. This component is configured to define rules for cost calculations, transaction priorities, application inventories, and routing table configurations. By setting these parameters, it governs the behavior of network operations, allowing for a tailored approach to network management based on specific business needs.

Network Monitoring Tools (704) are configured to continuously monitor real-time network performance metrics. These tools monitor performance metrics such as latency, bandwidth availability, memory utilization, CPU load, and throughput capacity, and collect the necessary metrics for analysis by the dynamic route optimization engine. This continuous monitoring ensures that the system has up-to-date information on network conditions, facilitating timely and informed decision-making.

The Integration Component (706) facilitates seamless communication and data exchange between the dynamic route optimization engine and the network monitoring tools. It ensures that there is continuous visibility into network performance metrics and that the dynamic route optimization engine receives accurate and current data. This integration is crucial for maintaining real-time synchronization and operational efficiency.

The Multi-Cloud and Hybrid Cloud Management Component (708) is designed to manage data transfer and processing across multiple cloud environments. It dynamically selects the most suitable cloud provider or on-premises resource based on real-time network conditions and configured rules, ensuring efficient and compliant data management across diverse platforms.

The Compliance and Security Component (710) ensures that all data transfer and processing activities adhere to regulatory requirements and organizational security policies. It enforces security protocols to maintain data security and routes data through compliant paths, thereby reducing the risk of non-compliance and enhancing data integrity and confidentiality.

The Predictive Analytics Component (712) leverages historical data to analyze trends and anticipate network congestion and other potential issues before they occur. It analyzes historical data to identify patterns and trends, allowing the system to forecast future network conditions and make proactive adjustments to routing paths to prevent performance degradation.

The Scalability Component (714) dynamically scales network operations to handle varying workloads and network demands. It adjusts network capacity to meet demand and updates routing tables and security groups based on real-time changes in network conditions, ensuring that the network can efficiently adapt to growth and fluctuations.

Adaptive Algorithms (716) continuously learn from past network conditions and predict future trends. These algorithms automatically learn from historical data to understand previous network behaviors and predict future trends to make proactive adjustments to routing paths, enhancing the system's ability to adapt to changing conditions.

The Cost Optimization Component (718) is configured to reduce operational expenses by optimizing data transfer costs. It makes routing decisions based on cost-effectiveness, selecting the most economical routes without compromising performance, thereby ensuring cost-efficient network operations.

Finally, the User Experience Component (720) is designed to enhance overall user experience by improving network performance, reducing latency, and ensuring efficient data retrieval and transaction processing. This component optimizes network efficiency and reduces latency to minimize delays in data transmission, leading to a superior user experience and increased user satisfaction.

In summary, FIG. 7 provides a detailed depiction of a dynamic route optimizing system where each component plays a vital role in ensuring efficient, secure, and adaptive network operations. The integration of these components enables the system to respond dynamically to real-time network conditions, optimize performance, maintain compliance, and reduce operational costs, ultimately enhancing the overall user experience.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A dynamic route optimizing system for optimizing network routing and data processing, comprising:

a processor and a non-transitory computer-readable medium storing instructions that, when executed by the processor, cause the processor to implement a dynamic route optimization engine configured to analyze real-time network performance metrics and adjust routing paths to optimize data transfer and processing, the dynamic route optimization engine further configured to:

utilize artificial intelligence and machine learning algorithms to enhance its decision-making processes;

analyze metrics selected from the group consisting of latency, bandwidth availability, memory utilization, CPU load, and throughput capacity;

adjust routing paths based on the analyzed metrics to minimize latency and maximize throughput;

a rule-based configuration component configured to allow users to define custom rules and parameters for transaction processing, data retrieval, and user authorization, the rule-based configuration component further configured to:

define rules for cost calculations, transaction priorities, application inventories, and routing table configurations;

set parameters that govern behavior of network operations;

network monitoring tools configured to continuously monitor real-time network performance metrics, the network monitoring tools further configured to:

monitor performance metrics selected from the group consisting of latency, bandwidth availability, memory utilization, CPU load, and throughput capacity;

collect metrics necessary for analysis by the dynamic route optimization engine;

an integration component configured to facilitate seamless communication and data exchange between the dynamic route optimization engine and the network monitoring tools, the integration component further configured to:

integrate with network monitoring tools to provide continuous visibility into network performance metrics;

ensure that the dynamic route optimization engine receives accurate and current data;

a multi-cloud and hybrid cloud management component configured to manage data transfer and processing across multiple cloud environments, the multi-cloud and hybrid cloud management component further configured to:

manage data transfer across different cloud providers and on-premises resources;

select a most suitable cloud provider or on-premises resource based on real-time network conditions and configured rules;

a compliance and security component configured to ensure that all data transfer and processing activities adhere to regulatory requirements and organizational security policies, the compliance and security component further configured to:

enforce security protocols to maintain data security;

ensure compliance by routing data through compliant paths;

a predictive analytics component configured to leverage historical data to analyze trends and anticipate network congestion and other potential issues before they occur, the predictive analytics component further configured to:

analyze historical data to identify patterns and trends;

anticipate issues by forecasting future network conditions;

a scalability component configured to dynamically scale network operations to handle varying workloads and network demands, the scalability component further configured to:

scale operations by adjusting network capacity to meet demand;

update routing tables and security groups based on real-time changes in network conditions;

adaptive algorithms configured to continuously learn from past network conditions and predict future trends, the adaptive algorithms further configured to:

automatically learn from historical data to understand previous network behaviors;

automatically predict future trends to make proactive adjustments to routing paths;

a cost optimization component configured to reduce operational expenses by optimizing data transfer costs, the cost optimization component further configured to:

optimize costs by making routing decisions based on cost-effectiveness;

select most economical routes without compromising performance; and a user experience component configured to enhance overall user experience by improving network performance, reducing latency, and ensuring efficient data retrieval and transaction processing, the user experience component further configured to:

enhance performance by optimizing network efficiency; and reduce latency to minimize delays in data transmission;

a quantum computing component configured to enhance the performance of the dynamic route optimization engine by:

leveraging quantum algorithms to analyze real-time network performance metrics with higher speed and accuracy;

optimizing the decision-making processes of the dynamic route optimization engine by processing vast amounts of data simultaneously;

improving the predictive analytics component by utilizing quantum computing to identify trends and forecast future network conditions more precisely; and accelerating a learning process of the adaptive algorithms by enabling faster analysis of historical data and prediction of future trends.

2. The system of claim 1, further comprising a quantum computing component configured to enhance the performance of the dynamic route optimization engine by:

leveraging quantum algorithms to analyze real-time network performance metrics with higher speed and accuracy;

optimizing the decision-making processes of the dynamic route optimization engine by processing vast amounts of data simultaneously;

improving the predictive analytics component by utilizing quantum computing to identify trends and forecast future network conditions more precisely; and accelerating a learning process of the adaptive algorithms by enabling faster analysis of historical data and prediction of future trends.

3. The system of claim 2, wherein the rule-based configuration component is further configured to support creation and management of multiple rule sets that can be applied based on different network conditions and operational requirements.

4. The system of claim 3, wherein the network monitoring tools are further configured to generate detailed performance reports at predefined intervals, providing insights into network trends and potential issues, and wherein the dynamic route optimization engine is further configured to provide real-time alerts to network administrators about significant changes in network performance metrics.

5. The system of claim 4, wherein the integration component is further configured to support integration with third-party network management and monitoring tools to enhance data visibility and analysis capabilities.

6. The system of claim 5, wherein the multi-cloud and hybrid cloud management component is further configured to implement load balancing strategies to distribute network traffic evenly across multiple cloud environments.

7. The system of claim 6, wherein the compliance and security component is further configured to automatically update security protocols and compliance rules based on changes in regulatory requirements and threat landscapes.

8. The system of claim 7, wherein the predictive analytics component is further configured to utilize machine learning algorithms to improve accuracy of trend analysis and issue anticipation.

9. The system of claim 8, wherein the scalability component is further configured to implement automated scaling policies that trigger adjustments in network capacity based on predefined performance thresholds.

10. The system of claim 9, wherein the adaptive algorithms are further configured to optimize network routing paths by continuously refining their predictions through feedback loops that incorporate real-time performance data and historical trends.

11. A dynamic route optimizing method for optimizing network routing and data processing, comprising the steps of:

defining, by a rule-based configuration component, custom rules and parameters for transaction processing, data retrieval, and user authorization, including cost calculations, transaction priorities, application inventories, and routing table configurations;

monitoring, by network monitoring tools, real-time network performance metrics, including latency, bandwidth availability, memory utilization, CPU load, and throughput capacity;

analyzing, by a dynamic route optimization engine, the real-time network performance metrics to determine most efficient routing paths for data transfer and processing, analysis considering historical performance data and predefined optimization criteria;

adjusting, by the dynamic route optimization engine, routing paths based on the real-time network performance metrics and the custom rules as defined and parameters to ensure optimal data flow and minimal network congestion;

integrating, by an integration component, with network monitoring tools to provide continuous visibility into network performance metrics and to inform routing decisions, ensuring synchronized operations across all monitoring and optimization tools;

managing, by a multi-cloud and hybrid cloud management component, data transfer and processing across multiple cloud environments by dynamically selecting a most appropriate cloud provider or on-premises resource based on real-time network conditions and defined custom rules, ensuring data compliance and cost efficiency;

ensuring, by a compliance and security component, that all data transfer and processing activities adhere to regulatory requirements and organizational security policies by automatically routing data through compliant paths and enforcing security protocols, maintaining data integrity and confidentiality;

utilizing, by a predictive analytics component, predictive analytics to analyze historical data, identify trends, and anticipate network congestion and potential issues before they occur, allowing for preemptive measures to mitigate identified risks;

scaling, by a scalability component, network operations to handle varying workloads and network demands by automatically updating routing tables and security groups based on changing network conditions, ensuring resource availability and optimal performance;

learning, by adaptive algorithms, from past network conditions and predicting future trends to proactively adjust routing paths, continuously improving accuracy and efficiency of the dynamic route optimization engine;

optimizing, by a cost optimization component, data transfer costs by making intelligent routing decisions based on real-time data and defined custom rules, ensuring cost-effective network operations without compromising performance;

enhancing, by a user experience component, user experience by improving network performance, reducing latency, and ensuring efficient data retrieval and transaction processing, thus ensuring high levels of user satisfaction and system reliability; and integrating, by the dynamic route optimization engine, quantum computing to analyze real-time network performance metrics with higher speed and accuracy, optimize decision-making processes by processing vast amounts of data simultaneously, and accelerate a learning process of the adaptive algorithms by enabling faster analysis of historical data and prediction of future trends.

12. The method of claim 11, further comprising the step of providing, by the dynamic route optimization engine, real-time alerts to network administrators about significant changes in network performance metrics, including potential bottlenecks, unusual traffic patterns, or security threats, enabling prompt intervention and resolution.

13. The method of claim 12, further comprising the step of supporting, by the rule-based configuration component, creation and management of multiple rule sets that can be applied based on different network conditions and operational requirements, allowing for adaptive policy enforcement and flexible network management.

14. The method of claim 13, further comprising the step of generating, by the network monitoring tools, detailed performance reports at predefined intervals, providing comprehensive insights into network trends, performance anomalies, and potential issues, thus facilitating informed decision-making and strategic planning.

15. The method of claim 14, further comprising the step of supporting, by the integration component, integration with third-party network management and monitoring tools to enhance data visibility and analysis capabilities, ensuring a holistic view of network performance and enabling seamless interoperability with existing infrastructure.

16. The method of claim 15, further comprising the step of implementing, by the multi-cloud and hybrid cloud management component, load balancing strategies to distribute network traffic evenly across multiple cloud environments, thereby optimizing resource utilization, preventing overloads, and enhancing overall network resilience.

17. The method of claim 16, further comprising the step of automatically updating, by the compliance and security component, security protocols and compliance rules based on changes in regulatory requirements and threat landscapes, ensuring continuous adherence to legal standards and protection against evolving cyber threats.

18. The method of claim 17, further comprising the steps of:

utilizing, by the predictive analytics component, machine learning algorithms to improve the accuracy of trend analysis and issue anticipation, enabling the system to learn from historical data and continuously enhance its predictive capabilities; and implementing, by the scalability component, automated scaling policies that trigger adjustments in network capacity based on predefined performance thresholds, ensuring that network resources are dynamically allocated to meet fluctuating demands and maintain optimal service levels.

19. The method of claim 18, further comprising the steps of:

leveraging, by the dynamic route optimization engine, artificial intelligence and machine learning algorithms to enhance the decision-making processes for analyzing real-time network performance metrics and adjusting routing paths;

utilizing, by the predictive analytics component, artificial intelligence and machine learning to improve the accuracy of trend analysis and issue anticipation by learning from historical data and continuously enhancing predictive capabilities; and integrating, by the dynamic route optimization engine, quantum computing to analyze real-time network performance metrics with higher speed and accuracy, optimize decision-making processes by processing vast amounts of data simultaneously, and accelerate a learning process of the adaptive algorithms by enabling faster analysis of historical data and prediction of future trends.

20. A dynamic route optimizing method for optimizing network routing and data processing, comprising the steps of:

defining, by a rule-based configuration component, custom rules and parameters for transaction processing, data retrieval, and user authorization, including cost calculations, transaction priorities, application inventories, and routing table configurations;

monitoring, by a network monitoring tool, real-time network performance metrics, including latency, bandwidth availability, memory utilization, CPU load, and throughput capacity;

analyzing, by a dynamic route optimization engine, the real-time network performance metrics to determine most efficient routing paths for data transfer and processing;

dynamically adjusting, by the dynamic route optimization engine, routing paths based on the real-time network performance metrics and the custom rules and the parameters;

integrating, by an integration component, with network monitoring tools to provide continuous visibility into network performance metrics and to inform routing decisions;

supporting, by a multi-cloud and hybrid cloud management component, multi-cloud and hybrid cloud environments by dynamically selecting a most appropriate cloud provider or on-premises resource based on the custom rules and real-time network conditions;

incorporating, by a compliance and security component, compliance and security considerations into routing decisions by automatically routing data through compliant paths and enforcing security protocols;

utilizing, by a predictive analytics component, predictive analytics to analyze historical data, identify trends, and anticipate network congestion and potential issues before they occur;

scaling, by a scalability component, network operations to handle varying workloads and network demands by automatically updating routing tables and security groups based on changing network conditions;

continuously learning, by adaptive algorithms, from past network conditions and predicting future trends to proactively adjust routing paths;

optimizing, by a cost optimization component, data transfer costs by making intelligent routing decisions based on real-time data and the custom rules;

enhancing, by a user experience component, user experience by improving network performance, reducing latency, and ensuring efficient data retrieval and transaction processing; and integrating, by the dynamic route optimization engine, quantum computing to analyze real-time network performance metrics with higher speed and accuracy, optimize decision-making processes by processing vast amounts of data simultaneously, and accelerate a learning process of the adaptive algorithms by enabling faster analysis of historical data and prediction of future trends.

* * * * *